US012639293B2

(12) United States Patent
Gisby

(10) Patent No.: US 12,639,293 B2
(45) Date of Patent: May 26, 2026

(54) SYSTEMS AND METHODS FOR PAGINATING SEARCH RESULTS RETRIEVED FROM DATABASES THAT SUPPORT CURSOR-BASED PAGINATION

(71) Applicants: Atlassian Pty Ltd., Sydney (AU); Atlassian US, Inc., San Francisco, CA (US)

(72) Inventor: Alexander Martin Gisby, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 180 days.

(21) Appl. No.: 18/091,259

(22) Filed: Dec. 29, 2022

(65) Prior Publication Data

US 2024/0220485 A1     Jul. 4, 2024

(51) Int. Cl.
*G06F 16/242* (2019.01)
*G06F 16/2453* (2019.01)
*G06F 16/248* (2019.01)

(52) U.S. Cl.
CPC ...... *G06F 16/2428* (2019.01); *G06F 16/2438* (2019.01); *G06F 16/24535* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 9,514,199 | B1 * | 12/2016 | Deprey | G06F 16/957 |
| 2011/0093500 | A1 * | 4/2011 | Meyer | G06F 16/972 |
| | | | | 707/774 |
| 2014/0123001 | A1 * | 5/2014 | M. | G06F 40/114 |
| | | | | 715/251 |
| 2016/0314173 | A1 * | 10/2016 | Lydick | G06F 16/256 |
| 2018/0121420 | A1 * | 5/2018 | Onusko | G06F 40/30 |
| 2018/0336364 | A1 * | 11/2018 | Haila | G06F 21/6227 |
| 2020/0409979 | A1 * | 12/2020 | Huang | G06F 16/283 |

* cited by examiner

*Primary Examiner* — Giuseppi Giuliani
(74) *Attorney, Agent, or Firm* — Brownstein Hyatt Farber Schreck, LLP

(57) ABSTRACT

Methods for paginating search results retrieved from a database that supports cursor-based pagination are disclosed. The method includes executing a first search on a first database. The first search is executed using a first search query and execution of the first search returns a first set of search results from the first database and a first opaque cursor. The method further includes processing at least a first subset of the first set of search results, selecting at least a second subset of the at least first subset of search results, and generating a first cursor object. The first cursor object including a Subitem value in accordance with all search results from the first set of search results being unprocessed. The Subitem value based on a number of results from the first set of search results processed in the at least first subset of search results.

20 Claims, 8 Drawing Sheets

100

422

602 — Merge search results from individual QEs into one result set

604 — Sort the result set

606 — No. of records > *n*

Yes

608 — Generate combined result set by selecting top *n* records

For each native query

610 — Recalculate next page custom cursor based on combined result set

No

612 — Combine page cursors into a single, combined cursor object

614 — Return combined result set and combined cursor obejct

900

902 — Receive input query

906 — Generate and forward error message

904 — Input query valid? — No →

Yes

908 — Previously run query? — No →

Yes

910 — Determine next page cursor

912 — Perform search (see Fig. 5)

914 — Return search results (first page thereof)

916 — Receive request for next page of search results

SYSTEMS AND METHODS FOR PAGINATING SEARCH RESULTS RETRIEVED FROM DATABASES THAT SUPPORT CURSOR-BASED PAGINATION

FIELD

The present disclosure generally relates to systems and methods for querying databases and in particular to systems and methods for paginating search results retrieved from databases that support cursor-based pagination.

BACKGROUND

Databases of various types are used in a huge range of computer applications and systems. Applicant has identified limitations, deficiencies, and problems associated with existing methods for querying and retrieving data from databases. Through applied effort, ingenuity, and innovation, these identified deficiencies and problems have been solved by developing solutions that are in accordance with the embodiments of the present disclosure, many examples of which are described in detail herein.

SUMMARY

According to a first aspect of the present disclosure a computer-implemented method is provided. The method includes executing a first search on a first database. The first search is executed using a first search query and execution of the first search returns a first set of search results from the first database and a first opaque cursor. The method further includes processing at least a first subset of the first set of search results, selecting at least a second subset of the at least first subset of search results, and generating a first cursor object. The first cursor object including a Subitem value if all search results from the first set of search results are not processed. The Subitem value based on a number of results from the first set of search results processed in the at least first subset of search results.

According to a second aspect of the present disclosure another computer-implemented method is provided. The method includes receiving a search request from a client application for a first page of search results, and executing, based on the search request, a first search on a database. The execution of the first search returns a first set of search results from the database and a first opaque cursor. The method further includes filtering the first set of search results to remove at least a subset of ineligible search results, and executing, based on the search request, a second search on the database. Execution of the second search returns a second set of search results and a second opaque cursor. The method also includes selecting at least a first subset of the second set of search results and adding to the filtered first set of search results to generate the first page of search results and generating a first cursor object. The first cursor object includes an After-value based on the first opaque cursor if all of the search results in the second set of search results are not selected or an After-value based on the second opaque cursor if all of the search results in the second set of search results are selected. In addition, the method includes returning the first page of search results and the first cursor object to the client application.

According to another aspect of the present disclosure there is provided a non-transitory computer readable medium comprising instructions which when executed by a processing unit cause the processing unit to perform the methods of the first and/or second aspects.

In certain other embodiments of the present disclosure a computer processing system for generating search output with pagination cursors is disclosed. The system includes a processing unit and non-transitory computer readable medium including instructions, which when executed by the processing unit, cause the computer processing system to perform the methods described above with respect to the first and/or second aspects.

Figure 1:
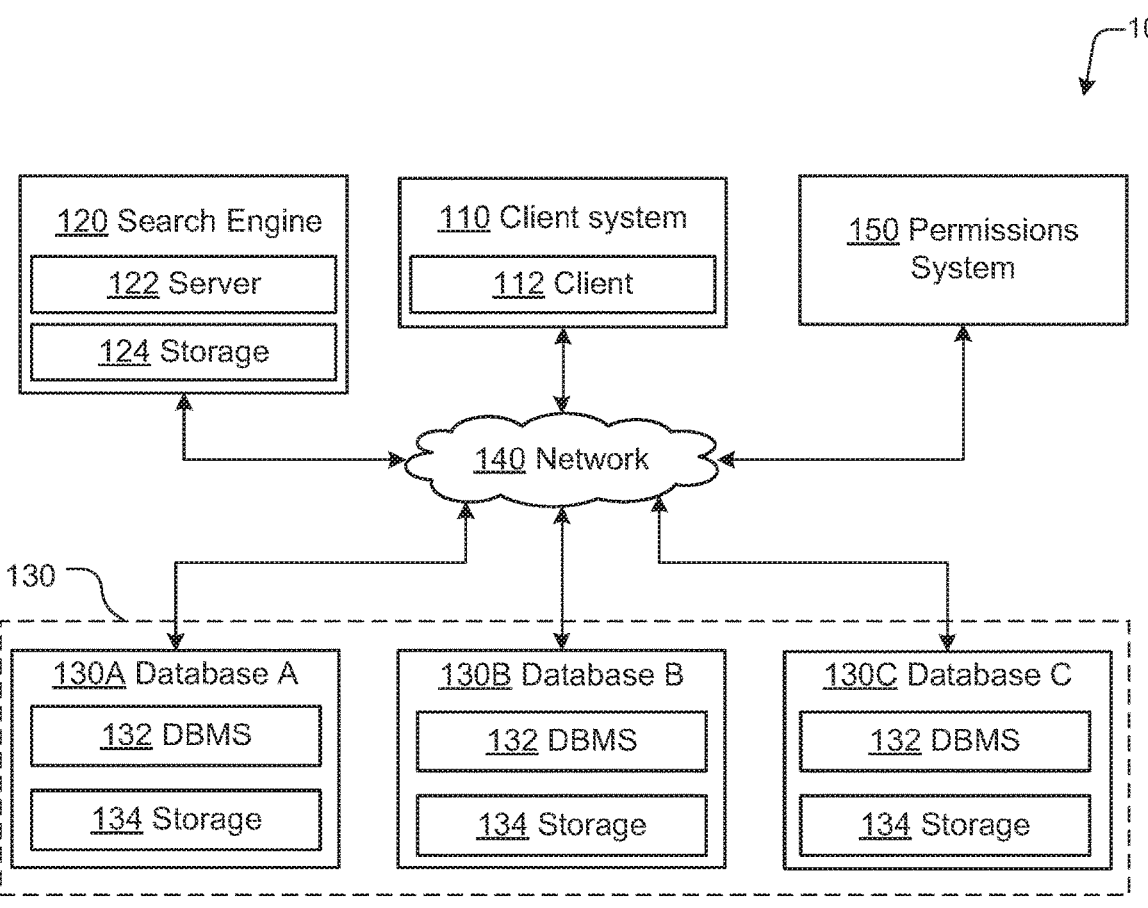
FIG. 1 is a diagram depicting a networked environment in which various features of the present disclosure may be implemented.

While the embodiments as claimed are amenable to various modifications and alternative forms, specific embodiments are shown by way of example in the drawings and are described in detail. It should be understood, however, that the drawings and detailed description are not intended to limit the scope of the embodiment to the particular form disclosed. The intention is to cover all modifications, equivalents, and alternatives falling within the scope of the present disclosure as defined by the appended claims.

DETAILED DESCRIPTION

In the following description, numerous specific details are set forth in order to provide a thorough understanding of the various embodiments, as described herein. It will be apparent, however, that various embodiment described in the present disclosure may be practiced without these specific details. In some instances, well-known structures.

Overview

The present disclosure is generally related to systems and methods for querying databases. As described above, databases are used ubiquitously by computer applications to store and retrieve data during execution of the computer applications. In addition to automatically storing data in and retrieving data from databases during execution, some computer applications allow end users to interrogate the underlying database and retrieve stored data. Generally speaking, in order to do so, an end user generates a database query, and the computer application executes this query on the database. Doing so effectively and efficiently can be difficult as end users need to be aware of not only the specific fields utilized by the database for storing the data but also the particular query syntax used by that particular database.

Problem of effectively/efficiently using databases is exacerbated when the data a user wishes to query is spread across multiple databases. In this case, a user may need to generate and execute separate queries for the different databases and then manage or view the separate result sets returned from the different databases independently. Furthermore, given different databases can run on different database technologies, this may well require knowledge of those technologies (e.g., the query language and syntax used by those databases) to properly form and run the different queries that are required.

To illustrate this, consider the example where a user wishes to view data associated with a given project, including, e.g., the team members, the status of tasks within the project, the leave schedule of team members, documents associated with the project, any source code pull requests associated with the project, any issues/tickets associated with the project, etc. This data may be stored in different databases. For example, team data may be stored in an employee database (e.g., an employee directory), issue data may be stored in an issue management database (e.g., managed by an issue management system such as Jira), source code data may be stored in a source code management database (such as GitHub), and documents may be stored in yet another database (such as a wiki). In order to retrieve this data, the end user may have to access each database separately through its own server-client arrangement, determine the correct syntax and query language for each database, interrogate each database using independent search queries, and retrieve and review results from each of those databases independently. As a person skilled in the art can appreciate this causes a significant cognitive burden on the end user, results in a poor user experience, and an inferior human-machine interface.

To address one or more of these issues with querying multiple databases, some aspects of the present disclosure introduce a search engine that is configured to receive a single input search query from a client device and query multiple different databases using that single search query. To do so, the search engine processes the input search query, identifies a plurality of databases to interrogate based on the query, generates individual native queries for the identified databases, causes execution of those individual native queries, receives search results from the databases, generates a combined search result set, and returns the combined search result set to the user.

Some aspects of the present disclosure further provide a unified search interface that not only allows a user to perform a search across multiple independent databases, but also displays the combined search result set to the user in a cohesive manner. This way, an end user can view different types of records associated with a given topic from different independent databases in a single set of search results by inputting a single query and the search engine and interface can perform the backend operations to generate native queries, query multiple databases, process the received results, generate a combined set of results (based on results from one or more of the multiple databases) that match the user's query, and display the combined set of results in an integrated manner to the end user.

Another issue with querying databases that often arises is due to databases typically returning results in a paginated manner. That is, while a database may have a set of n records that match a given input search query, it generally returns a subset of m search results or records at a time (each subset of m records being a subset of the set of n matching records and being referred to as a page) to reduce processing time and display results to the end user as soon as possible. To illustrate, if the page size for a given search query was 10 records, the first time the search query is executed, a first page of results (e.g., records 1 to 10) would be returned or displayed on a user device of the requesting end user. The end user may then request the next page of results, in which case the database is queried a second time to return the second page of results (e.g., records 11 to 20) and so forth.

To limit a database search to a specific subset (or page) of search results, offset-limit pagination or cursor-based pagination are often used. Generally speaking, offset-limit pagination allows pagination by skipping a number of records (i.e., the offset). For instance, if a search query matches 100 records and the page size of each page is set to 20 records (the limit), the first result page will show records 1 to 20. To show the next page, i.e., records 21 to 40, the query submitted to the database includes an offset that skips the first 20 items and a limit that indicates the number of records required. A query in offset-limit pagination may have the following form—select * from items limit 20 offset 20—and the result may be records 21-40 that match the input search query.

In cursor-based pagination, instead of skipping or offsetting the results by a fixed number to move across pages or subsets of records, cursors may be employed. In particular, the identifier of a record in a set of records is used as a cursor or pointer—indicating the last record communicated by the database. Using the cursor, records before or after that cursor can be retrieved. Using the same 100 records example described above, a first page may display records 1 to 20. To get the next page, an identifier of item 20 is used as a cursor to get items after it. A query in cursor-based pagination may have the following form—select * from items where id>20 limit 20—and the result may be records 21-40 and a cursor including the identifier of the 40th record. When requesting the next page, the cursor is returned to the database to get the next subset of records.

Both these pagination techniques have advantages and disadvantages. For example, with offset-limit pagination, if an item from a prior page or subset is deleted while the client is paginating, all subsequent records will be shifted forward by one. Therefore, when the user device requests the next page, one record will be skipped over and would never be displayed on the user device. Conversely, if a result is added to the list of results as the computer application is paginating, the same record may be displayed multiple times on the user device, on different pages. Cursor-based pagination can prevent both of these possibilities.

On the other hand, as any offset and any limit can be selected in offset-limit based pagination, this technique allows any specific page or subset of records (e.g., page 5 or records 25-35) to be requested. Cursor-based pagination on the other hand does not allow this. Instead, only a next or a previous page can be requested in cursor-based pagination as the identifier of a particular record is selected as the cursor or pointer.

Some database technologies, such as PostgreSQL, use offset-limit pagination whereas other database technologies, such as ElasticSearch, use cursor-based pagination. Accordingly, managing cursors and/or offsets for pagination—particularly where search results are being retrieved from multiple databases that utilize different pagination techniques—can also prove problematic.

For example, consider the situation where a search engine receives a search query from a user device for 10 records that match the search query. The search engine may then request 10 records for that particular query to be returned by a database that uses cursor-based pagination. In this case, the database may return the first 10 records matching the query and provide a cursor for requesting the next page. The search engine may filter the 10 records received from the database, e.g., based on permissions associated with the requesting user, and may determine that the user does not have permission to view 4 of the first 10 records. The search engine may then filter/discard those 4 records. It now only has 6 records matching the search query, while the user had requested 10 records. To make up the difference, the search engine may request the database for the set of next 10 records (i.e., records 11-20) from the cursor of the $10^{th}$ record. It may then filter records 11-20 based on user permissions again and pick the first four records the user has permission to view and add these to the previous six results and communicate this to the user device.

However, as the search engine has partially consumed the second page (i.e., records 11-20), it cannot use the second page cursor as the cursor for the next page as this cursor represents the end of the second page of results and only four results from this page were consumed or communicated to the user device. Further, the search engine cannot use the first page cursor as the cursor for the next page as some results from the second page have already been consumed. Accordingly, this situation causes an issue with using standard cursor-based pagination.

To address these issues with managing pagination cursors, some aspects of the present disclosure provide custom cursor objects that not only indicate the next page of search results to be requested but whether any of those results have already been consumed by the search engine and/or displayed to the user. In particular, aspects of the present disclosure generate and update these custom cursor objects for databases that use cursor-based pagination to allow an arbitrary set of results to be used by the search engine without the need to make any changes in the underlying database.

The cursor object may include information about a next page cursor, the size of the subset of records or page, and information about the number of records in the corresponding page that have already been considered and/or delivered to the user device.

When a search engine needs to retrieve the next set of results, it utilizes the custom cursor object and in particular the information about the next page cursor and the size of the page to retrieve the next page of results from an underlying database that supports cursor-based pagination. The search engine utilizes the information about the number of records that have already been considered to omit those retrieved records from consideration. For example, if the custom cursor indicates that the next page cursor is fjk3d, and the size of the subset is 10, the search engine may request the database to provide the next 10 records from the cursor fjk3d. The search engine may then check the custom cursor object to determine that three of those records have already been considered or delivered to the user device. Accordingly, the search engine may discard the first three results.

In this way, the search engine may utilize cursor-based pagination offered by an underlying database while still being able to select and display an arbitrary subset of the records to an end user.

Pagination issues may also arise when retrieving search results from multiple databases. For example, consider the situation where a search engine combines search results from different databases (that employ different pagination techniques) into a combined set of results. In this case, it may request each individual database to provide a first page of records, it may then merge and sort the records from the individual databases in a combined first page of results to communicate to the user device. In doing so, the search engine may not utilize all the records received from the various databases. However, as the search engine may have only partially consumed the first page of results from one or more of the underlying databases, it cannot use the second page cursor or offset provided by the underlying databases to retrieve the next set of results as the cursor for the next page represents the end of the first page of results and only a few of these results may have been consumed or communicated to the user device. Further, as different number of search results may have been used from the different databases, it may be difficult for the search engine to keep track of the number of results used from the different databases using standard cursors or offsets.

To address these issues with managing pagination cursors and offsets, some aspects of the present disclosure provide combined custom cursor objects. In particular, some aspects provide mechanisms for generating and recording combined custom cursor objects for search queries that involve multiple underlying databases—that may use different pagination techniques. The combined cursor object may be a concatenation of individual custom cursor objects associated with each of the individual underlying databases, where each cursor object includes information about the next page cursor, the size of the next page, and (if applicable) information about the number of records in the next page that have already been considered and/or delivered to the user device. Using combined cursor objects, aspects of the present disclosure can track the position of search result subsets in each underlying database.

These foregoing and other embodiments are discussed below with reference to FIGS. 1-9. However, those skilled in the art will readily appreciate that the detailed description given herein with respect to these figures is for explanation only and should not be construed as limiting.

System Overview

FIG. 1 depicts an exemplary environment 100 in which one or more aspects of the present disclosure are implemented. Specifically, FIG. 1 illustrates the various systems involved in retrieving data based on search queries according to embodiments of the present disclosure. The systems include client system 110, a search engine 120, and one or more databases 130A, 130B and 130C (collectively referred to as databases 130). The client system 110, search engine 120, and databases 130 communicate with each other over one or more communication networks 140.

Client system 110 hosts a client application 112 which, when executed by the client system 110, configures the client system 110 to provide client-side functionality. The functionality offered by the client application 112 may include, for example, interacting with (i.e., sending data to and receiving data from) the search engine 120. Such interactions typically involve generating search queries automatically or based on end-user input, communicating search queries to the search engine 120, receiving search results from the search engine 120, displaying the search results, requesting subsequent pages of search results, etc.

Client application 112 may be a general web browser application (such as Chrome, Safari, Internet Explorer, Firefox, or an alternative web browser application) which accesses a search server 122 via an appropriate uniform resource locator (URL) and communicates with the search engine application via general world-wide-web protocols (e.g., http, https, ftp). Alternatively, client application 112 may be a specific/native application programmed to communicate with the search engine 120 using defined application programming interface (API) calls.

A given client system 110 may have more than one client application 112, for example both a general web browser application and a dedicated programmatic client application.

Client system 110 may be any computer processing system which is configured (or configurable) by hardware and/or software to offer client-side functionality. By way of example, suitable client systems may include server computer systems, desktop computers, laptop computers, netbook computers, tablet computing devices, mobile/smart phones, and/or other computer processing systems.

Very generally speaking, the search engine 120 acts as an intermediary between the databases 130 and the client system 110 such that the client system 110 only interacts with the search engine 120 while the search engine 120 communicates with the databases 130 to retrieve results. This way, the client system 110 and the end user only needs to know the query language and the queryable syntax for the search engine 120, while the search engine 120 can maintain information about the query languages, syntax, and other requirements for the databases 130 it is in communication with.

The search engine 120 includes a search server 122 and a storage 124. The search server 122 receives/responds to search queries from client systems 110 and communicates with one or more databases 130 to retrieve/store data.

To respond to search queries from client devices the search server 122 performs one or more of the following two functions—combining search results from different databases into a combined set of search results, and generating and updating custom pagination cursors for a search query. In some embodiments, where pagination is not performed, the search engine may only perform the first function, i.e., combine search results from different databases into a combined set of search results. In other embodiments, where pagination is performed, but results are obtained from a single database, the search engine 120 may only perform the second function, i.e., generating and updating custom cursors for the search query. In yet other embodiments, where pagination is performed and results are obtained from multiple databases, the search engine 120 may perform both the functions—combine the search results into a combined set and generate/update custom cursors for pagination.

In addition to this, the search server 122 may also be configured in some embodiments to determine whether the end user has permission to view the search results received from the one or more databases 130. In such embodiments, the environment 100 may further include a permissions system 150.

The permissions system 150 manages permissions to access content maintained by the databases 130. In particular, the permissions system 150 may be configured to receive a query to determine whether a user account has access to a particular resource and respond to that query based on the permission data stored and managed by the permissions system 150.

Operations of the search server 122 and the particular modules utilized will be described in detail with reference to FIG. 2.

In general, databases 130 include one or more database management systems (DBMS) 132 and one or more data storage systems 134 (operating on one or multiple computer processing systems). Generally speaking, DBMS 132 receives queries from the search engine 120, interacts with data storage system 134 to read/write data as required by those queries, and responds to the search engine 120 with results of the query.

The data storage systems 134 may store any data. Such data includes data records (or, in some cases, records for short). In this context, a data record is a logical grouping of data. Data for a data record may be stored across multiple database tables that are related to one another by one or more database keys (for example object identifiers and/or other identifiers). In the present disclosure, data records are also referred to as "queryable entities" (which will be discussed in detail later).

By way of a specific example, databases 130A, 130B, and 130C may be associated with the same entity or organization and may store different types of data for that entity or organization. For example, database 130A may be associated with an issue tracking system (such as Jira) and may store issue data for one or more projects/teams in the organization. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

Database 130B may store user data of employees of the entity or organization. In this case, database 130B may store various data in respect of a given user, for example: a user identifier, a user email address, a phone number, an avatar/picture, identifiers of one or more teams the user is a part of, identifiers of one or more projects the user is currently working on, identifiers of one or more managers or subordinates of the user, identifiers of one or more software applications the user has accounts with, a username, etc.

Database 130C may be associated with a wiki application (such as Confluence) and may store documents related to one or more teams or projects in the organization. In this case, the database 130C may store various data in respect of each document, for example: document identifier, document title, identifier of the team or project it is related to, identifier of one or more authors of the document, permissions associated with the document, content of the document including text, images, tables etc., any comments made in relation to the document, document history, etc.

In at least some embodiments, the databases 130 support pagination—i.e., the databases are configured to return one or more subsets or pages of records matching a given query. In these embodiments, one or more of the databases 130 may provide offset-limit based pagination (which allows arbitrary subsets or pages of search results to be retrieved) and the other databases 130 may provide cursor-based pagination (which does not allow arbitrary subsets or pages of search results to be retrieved). If a database 130 supports cursor-based pagination, it may respond to the search engine 120 with a subset or page of results matching the query and an opaque cursor or pointer for the next subset or page of results.

It will be appreciated that the databases 130 may be based on different database technologies, use different query languages, different database syntax, and different pagination techniques. Examples of databases 130 include SQL databases such as PostgreSQL that support offset-limit based pagination and no SQL databases such as ElasticSearch that support cursor-based pagination.

The client system 110, search engine 120, databases 130, and permission system 150 communicate data between each other either directly or indirectly through one or more communications networks 140. Communications network 140 may comprise a local area network (LAN), a public network, or a combination of networks.

Further, while single server architecture has been described herein, it will be appreciated that the systems described and depicted in FIG. 1 can be implemented using alternative architectures. For example, in certain cases a clustered architecture may be used where multiple server computing instances (or nodes) and/or multiple memory instances are instantiated to meet system demand.

Further still, it will be appreciated that although the environment 100 shows three databases 130 and one search engine 120, this need not be the case in all implementations. In some implementations fewer or more databases 130 may be interfaced with the search engine 120. Similarly, in those or other implementations, more than one search engine 120 may be interfaced with the databases 130. In addition, it will be appreciated that although FIG. 1 depicts a single client system 110 for clarity, this would usually not be the case in actual implementation. Instead, multiple client systems 110 may submit search queries to the search engine 120 and receive search results from the search engine 120.

Search Engine

As described above, in a general sense, the search engine 120 is an intermediary between the client system 110 and the databases 130. Where the search engine is used to query multiple underlying databases, the search engine 120 has its own query language and syntax and each of the databases 130 may have their own native query language and syntax which may or may not be the same as the query language/ syntax of the search engine 120.

In such embodiments, whenever a new database 130 is introduced to the environment 100, the search engine 120 is made aware of the new database 130. The search engine 120 then generates information about the database 130 and stores it in its storage 124 as described below. In particular, it maintains information about the type of data maintained by the database (i.e., the queryable entities maintained by the database), the fields maintained by the database for each queryable entity, and the type of operators allowed by the database. It also maintains information about how those fields and operators equate to the fields and operators used by the search engine 120.

As used herein, the term queryable entity refers to an entity that a database 130 maintains information in respect of. The queryable entity may be anything such as a project, a goal, an issue, a person, a team, etc. In the example databases described above, issues in database 130A can be considered queryable entities, users and/or teams in database 130B can be considered queryable entities, and project and/or documents in database 130C may be considered queryable entities.

The search engine 120 stores information about these queryable entities in storage 124. In one example, the information may be stored in a data structure or table as shown in table A below, where the table stores the queryable entities available and the corresponding database which maintains those queryable entities. In other examples, the search engine 120 may maintain different data structures or tables for different databases, where each table includes a list of queryable entities maintained by the corresponding database.

TABLE A

Example data structure for storing queryable entity information.

| QE | Database |
|---|---|
| Project | Database 130A |
| Document | Database 130C |
| Issues | Database 130A |
| Users | Database 130B |
| Team | Database 130B |

Each queryable entity is associated with one or more queryable entity "fields" in which the entity data is stored. By way of example, where the database 130 maintains a queryable entity is an SQL database, data in respect of an entity may be stored across one or more tables, and relevant columns of that those tables may be queryable fields. For instance, in the case of database 130A, each of the following data items associated with a given issue record can be considered a queryable entity field: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders.

As will be appreciated, different databases may have different fields. The search engine 120 provides a layer of abstraction above these field names and maintains its own fields. It then maintains translation or compatibility information between its own fields and the fields used by the various databases. For example, the search engine 120 may maintain a field called "name," which it may equate to the "user name," "team name," "project title," "document title," and/or "issue title" fields maintained by the various underlying databases 130. This way, the end user may be able to generate a simple query such as "name LIKE legal" and the search engine 120 may be able to search the various databases to retrieve all user names, team names, project titles, document titles or issue titles that include a word similar to Legal without the end user needing to know the particular fields maintained by the various databases.

In addition, each database 130 may use different field operators and field value formats. The search engine 120 may provide a layer of abstraction above these field operators and field value formats. To do so, it maintains its own field operators and field value formats. It then maintains translation or compatibility information between its own operators and the operators used by the various databases.

Table B below shows example search engine field data maintained by the search engine 120. The field data includes the search engine field names and the corresponding rules for those fields, such as what operators can be used for a given field and what field value data types are acceptable for that field.

TABLE B

| | Example field data | | |
| --- | --- | --- | --- |
| USS field ID | USS Field name(s) | USS field operator(s) | USS field value format(s) |
| USS-F1 | {name, title} | {like, =, NOT} | string |
| USS-F2 | {date} | {=, <, <= , >, >=} | string - dd-mm-yyyy |

Table C below shows example field translation data maintained by the search engine. The translation data includes field mapping data that maps the search engine fields to the database fields. For example, the search engine field "name" may be mapped to the "project title" field for the "project" queryable entity and it may also be mapped to the "team name" field for the "team" queryable entity. It will be appreciated that multiple database fields may map to the same search engine field. Conversely, the same search engine field can map to multiple database fields. This enables polymorphism. For example, the search engine fields "name" and "title" may both map to the same "project title" field for the project queryable entity.

The field translation data also includes field value translation data that is used to map the SE field value to a format as required by the relevant database. For example, an SE field value may be a date format such as yyyy-mm-dd, but the corresponding database may require an alternate date format. The search engine stores any such translations.

TABLE C

| | Example field translation data | | |
| --- | --- | --- | --- |
| SE field ID | QE | QE field | Field value translation data |
| SE-F1 | Project | Project title | None |
| SE-F1 | User | User name | None |
| SE-F1 | Team | Team name | None |
| SE-F2 | Project | Date | yyyy-mm-dd |

The translation data may further include operator mapping data that maps the search engine operators with the operators allowed by the different databases 130. For example, if the search engine operator is "=" and one database require "=" while another database requires "==", then the search engine 130 maintains this correspondence. Table D illustrates example operator translation data.

TABLE D

| Example field operator translation data | | |
| --- | --- | --- |
| SE operator | Data source | Data source operator |
| = | DS1 | = |
| = | DS2 | = = |
| LIKE | DS1 | LIKE |
| LIKE | DS2 | INCLUDES |
| FROM | DS1 | IN |

In addition to its own field data and the field and operator translation data, the search engine 120 may also maintain syntax data, which includes the rules that define the proper construction of a search query.

It will be appreciated that this data (e.g., data described with reference to tables A-D) may be stored in the storage 124. In some examples, to ensure the data is up to date, the search engine 120 may periodically query the various databases 130 in environment 100 to check if any of the data has changed—e.g., if any queryable entities have been added or deleted, any fields have been added or deleted, or any other configuration changes have been made to the databases. If changes are made, the search engine 120 may update the affected data in storage 124. For example, if new queryable entities are added to the database, these may be added to table A. Similarly, if a field has been deleted for a particular queryable entity, the search engine 120 may delete the corresponding field from table C. In other examples, the information in tables A and B may be manually updated on a periodic basis.

During operation, when configured to perform searches in multiple databases, the search engine 120 receives a search query from a client system 110. In response to this, the search engine 120 identifies one or more queryable entities from the search query, identifies the databases those queryable entities are maintained by, and then converts the received search query into native query formats acceptable by the identified (e.g., by performing a lookup in the field and operator translation data tables). It then communicates the native queries to the one or more identified databases 130, receives search results from the databases, and provides combined results from the databases that match the search request to the client system 110.

Figure 2:
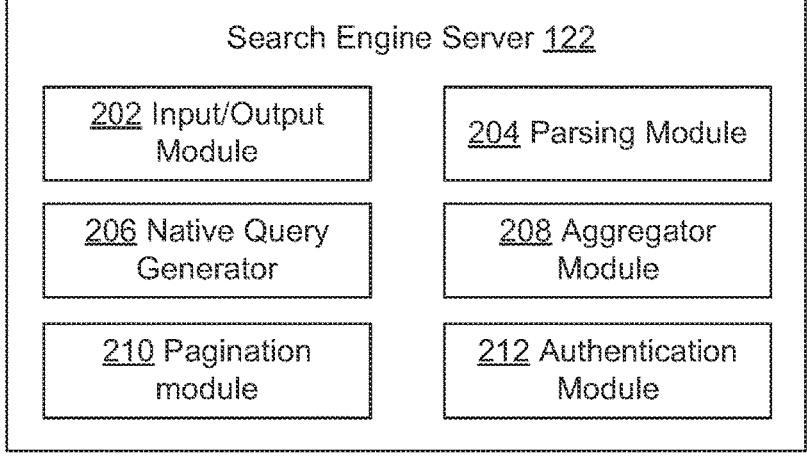
FIG. 2 is a diagram depicting a search engine according to aspects of the present disclosure.

To perform these steps, the search server 122 includes a number of modules or subsystems, which are illustrated in FIG. 2. These modules include an input/output module 202, a parsing module 204, a native query generator 206, an aggregator module 208, a pagination module 210, and an authentication module 212.

The input/output module 202 may be configured to communicate with the client systems 110 and the databases 130. In particular, it may be configured to receive search requests from client devices and respond to these search requests, and it may be configured to communicate search native search queries to one or more databases 130 and receive results that match those native search queries from the one or more databases 130.

The parsing module 204 is configured to receive search queries from the input/output module 202 and scan the search queries to determine whether the search queries include fields, operators, or other syntax that the search engine 120 can handle. It may also identify syntactical errors and/or spelling errors in the search requests. Further still, the parsing module 204 may be configured to identify at least one queryable entity within the search query and identify the database that serves the identified queryable entity.

The native query generator 206 is configured to analyze the parsed query to identify portion in the query that relate to particular databases and then convert those portions into native queries for those particular databases (e.g., by converting the field and/or operator in the search query to the field and/or operator used by the underlying database).

The aggregator module 208 is configured to receive search results provided by individual databases from the input/output module 202, combine the search results in a combined result set, and communicate the combined result set to the input/output module 202 for communication to the client system 110.

The aggregator module 208 may also order the search results based on one or more predetermined factors and determine a maximum number of search results to add in the combined result set (e.g., based on the number of results requested by the client system 110).

In some embodiments, the search results may be filtered, e.g., based on permissions before they are added to the combined result set. In such embodiments, the search results from the individual databases are provided to the authentication module 212 which is configured to determine whether the end user has permission to view the search results. In particular, the authentication module 212 communicates with the permissions system 150 to determine whether a user has permission to view the records received from the databases 130. If the authentication module 212 determines that the user has permission to view a record, the search engine 120 keeps the record in the result set. Otherwise, it discards the record.

In some other embodiments, the search engine 120 may be configured to provide the search results to the client system 110 in a paginated form. That is, it may be configured to provide the search results (in case retrieved from a single database) or the combined result set (in case retrieved from multiple databases) in pages of predefined sizes. In these cases, the search engine 120 includes the pagination module 210 that is configured to manage pagination data for active search queries and provide this information to the native query generator or the aggregator module 208 if requested.

In one example, the pagination module 210 maintains data related to the pagination technique adopted by the databases 130 in environment 100. Table E illustrate example pagination information maintained by the pagination module 210 in the storage 124. As seen in this table, the data includes the database identifier and the pagination technique used.

TABLE E

| example pagination data | | |
| --- | --- | --- |
| Database | Pagination technique | Pagination format |
| Database 130A | Cursor-based | Cursor {record id} |
| Database 130B | Cursor-based | Cursor {record id} |
| Database 120C | Offset-limit | Offset X, limit X |

As described previously, the search engine 120 generates its own custom cursor objects that indicate not only the record or search results until which the underlying database has provided its search results but also indicates the record or search result within a page that the search engine has considered and added to a previous page already communicated to a client system 110.

In some examples, the custom cursor object may specify the above by including an "After" value that indicates an identifier of a starting record in a set of ordered records that match the search criteria. For an offset-limit based database, this After-value may include the index or record number of the starting record in a set of ordered records that match the search criteria. For a cursor-based database, this After-value may include an opaque identifier of the next page of records. It may indicate the last record sent by the database to the search engine from a set of records that match the search criteria.

The custom cursor object may further include a maximum value (x) indicating the maximum number of records requested from the corresponding database. The custom cursor object may still further include a "SubItem" value. This SubItem value indicates the number of records included in that page of search results that have already been considered and added or discarded by the search engine to previous search results. In some examples, the "SubItem"

value is included for custom cursors where the underlying database uses cursor-based pagination.

In one specific example, the custom cursor object may have the following form: [After=value, Limit=x, SubItem=value].

In some embodiments, the search engine 120 may generate and maintain these custom cursor objects in the storage 124 during a cycle of the searching process. When the result set is ready to be sent to the client application 112, the custom cursor may be updated and forwarded to the client application 112 along with the search results and the client may store the custom cursor until it wishes to request the next page of results. The custom cursor may then be flushed from the search engine 120 once it is communicated to the client. In this manner, the search engine 120 is not required to maintain the state of the search or any records while a user is viewing and engaging with the search results. In other embodiments, the search engine 120 may generate and maintain these custom cursor objects persistently while the client application 112 display the search results associated with the input search query. In such embodiments, the custom cursor objects may be deleted/flushed once the search engine 120 determines that the client application 112 is no longer displaying the search results associated with the input search query.

If the search results are obtained from multiple databases or for multiple queryable entities, the custom cursor objects generated for each queryable entity are concatenated into a combined custom cursor object. In one specific example, the concatenated custom cursor object may have the following form:

Queryable Entity #1[After=value,Limit=x,
    SubItem=value];Queryable Entity
    #2[After=value,Limit=x];Queryable Entity
    #3[After=value,Limit=x,SubItem=value].

The concatenated custom cursor object may be stored or communicated to the client system 110 along with the search results.

The manner in which the custom cursor objects are generated and updated will be described in detail with reference to the method figures.

Hardware Overview

The embodiments and features described herein are implemented by one or more special-purpose computing systems or devices. For example, in environment 100 each of the client systems 110, the search engine 120, and the databases 130, is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further, alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device, or any other device that incorporates hard-wired and/or program logic to implement relevant operations.

Figure 3:
FIG. 3 is a block diagram of a computer processing system configurable to perform various features of the present disclosure.
Figure 3:
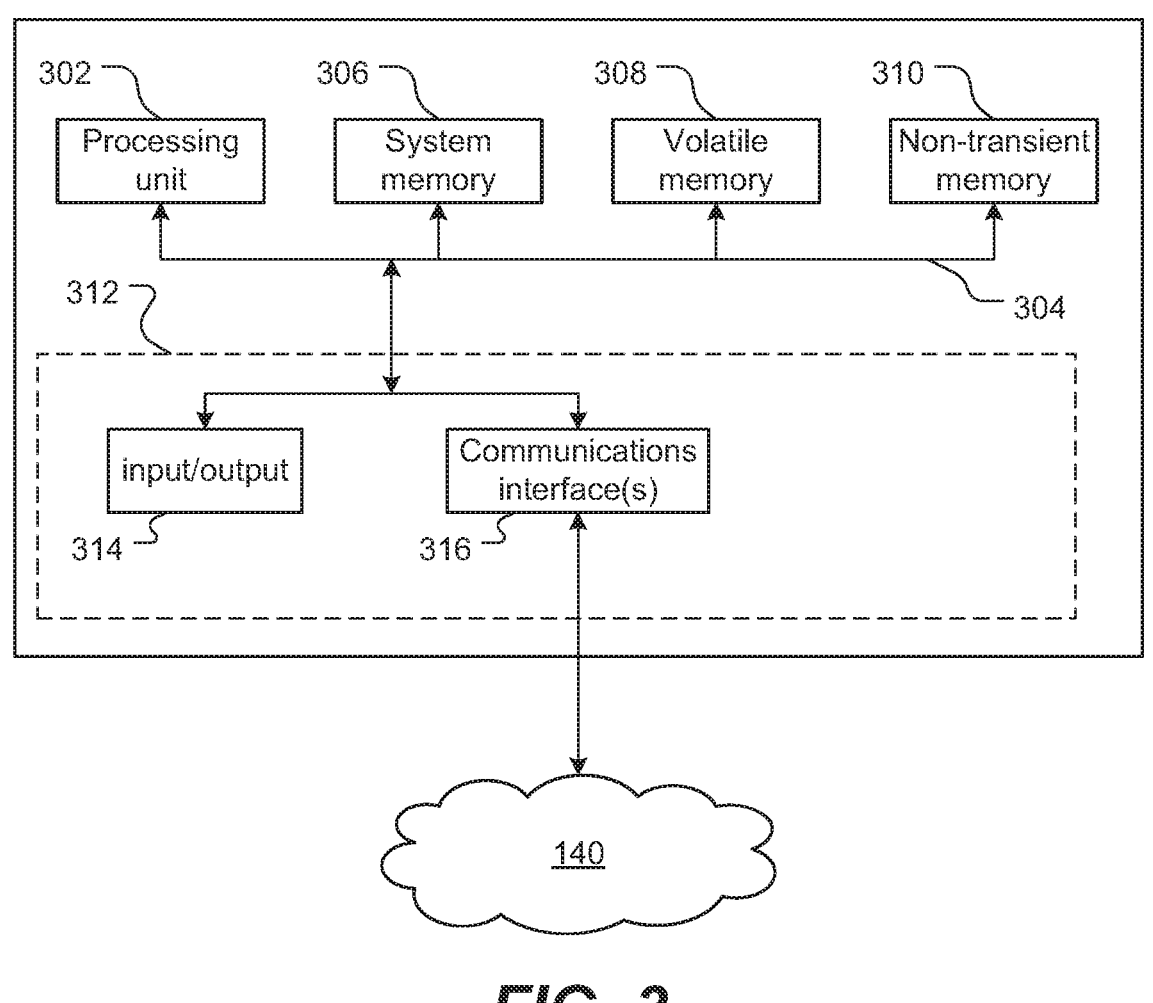

FIG. 3 provides a block diagram of a computer processing system 300 configurable to implement embodiments and/or features described herein. System 300 is a general-purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example, a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with a one or more computer readable storage devices which store instructions and/or data for controlling operation of the processing system 300. In this example system 300 includes a system memory 306 (e.g., a BIOS), volatile memory 308 (e.g., random access memory such as one or more DRAM applications), and non-volatile (or non-transitory) memory 310 (e.g., one or more hard disks, solid state drives, or other non-transitory computer readable media). Such memory devices may also be referred to as computer readable storage media (or a computer readable medium).

System 300 also includes one or more interfaces, indicated by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated by input/output device interface 314). Input devices are used to input data into system 300 for processing by the processing unit 302. Output devices allow data to be output by system 300. Example input/output devices are described below; however, it will be appreciated that not all computer processing systems will include all mentioned devices, and that additional and alternative devices to those mentioned may well be used.

For example, when the system 300 is client system 110 it may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example memory devices/computer readable media (e.g. hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 140 of environment 100. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple IOS™, Android™, Unix™, or Linux™.

System 300 also stores or has access to applications which, when executed by the processing unit 302, configure system 300 to perform various computer-implemented processing operations described herein. For example, and referring to networked environment 100 of FIG. 1 above, the client system 110 includes client application which configures the client system 110 to perform operations of the client device, and the search engine 120 includes a server application that configures the search engine to perform the operations of the search engine 120.

In some cases, part or all of a given computer-implemented method will be performed by a single computer processing system 300, while in other cases processing may be performed by multiple computer processing systems in data communication with each other.

Example Methods

Figure 4:
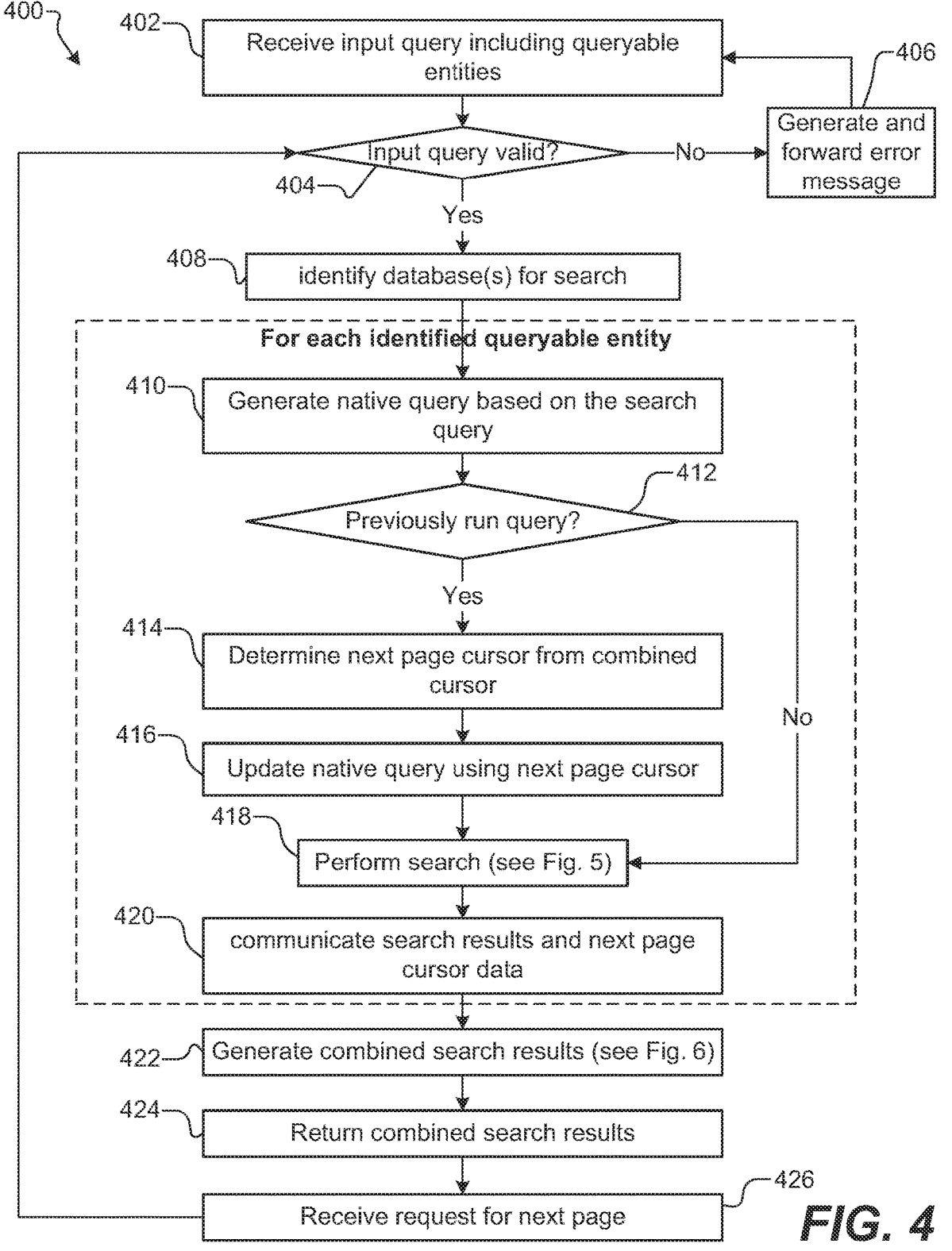
FIG. 4 is a flowchart illustrating an example method for processing a search query according to some aspects of the present disclosure.
Figure 5:
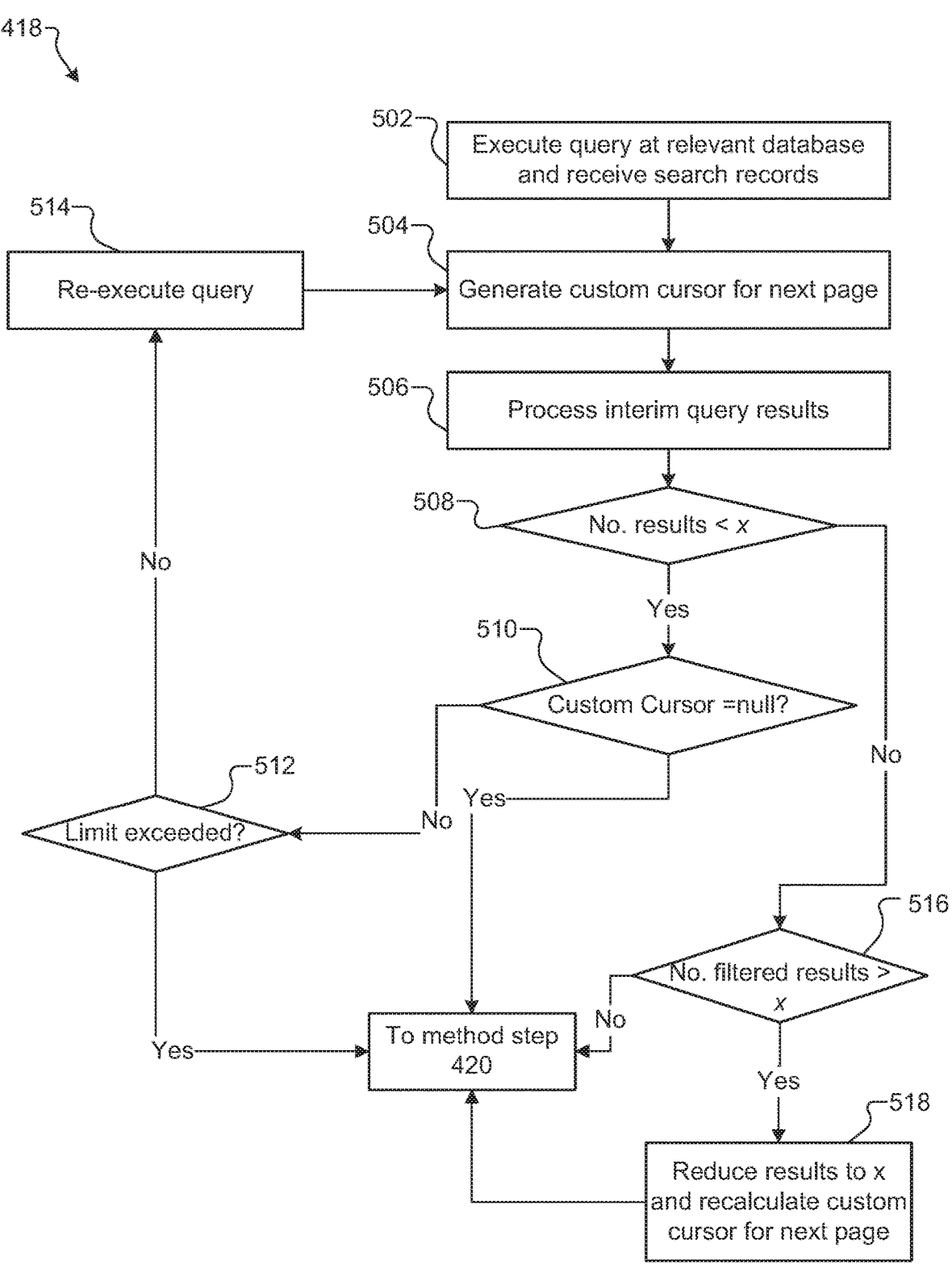
FIG. 5 is a flowchart illustrating an example method for executing a native query according to some aspects of the present disclosure.
Figure 6:
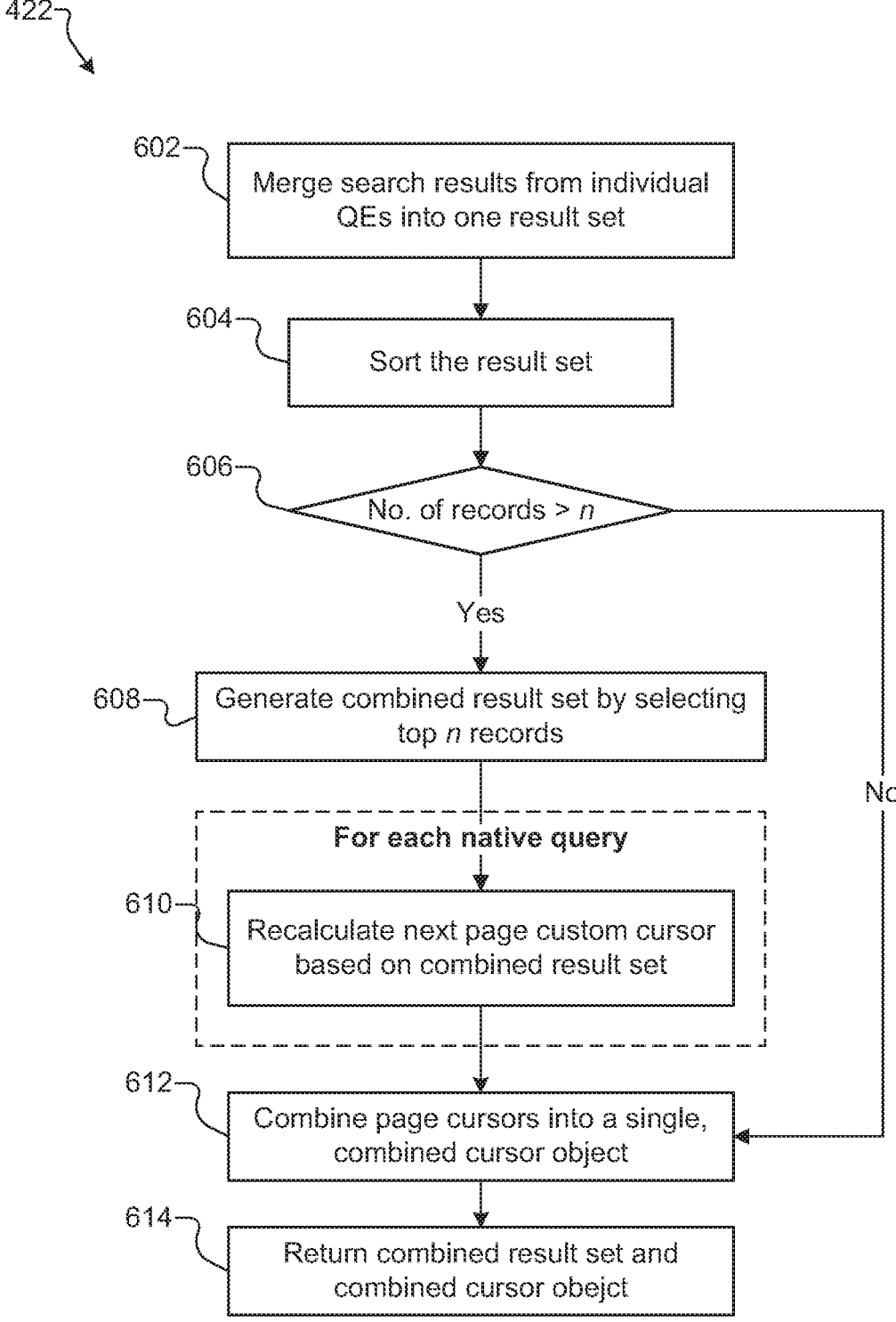
FIG. 6 is a flowchart illustrating an example method for generating a combined set of search results according to some aspects of the present disclosure.
Figure 9:
FIG. 9 is a flowchart illustrating an example method for processing a search query according to some other aspects of the present disclosure.

This section describes computer-implemented methods for providing search results for a search query according to aspects of the present disclosure. In particular, FIG. 4 illustrates an example method performed by a search engine 120 that is configured to perform searches in one or more of multiple databases whereas FIG. 9 illustrates an example method performed by a search engine 120 that is configured to communicate with a single database that supports cursor-based pagination.

The method 400 commences at step 402, where the input/output module 202 of the search engine 120 receives an input search query from the client system 110. In one example, an end user may use client application 112 to perform a search—for example, an end user may wish to find different types of objects the end user is associated with. This may include documents where the end user has been an author, issues assigned to the user, teams the user is a part of, users that report into the end user, projects the end user is a part of, etc. Similarly, the end user may wish to find different types of objects associated with a given topic—e.g., project Atlas. This may include documents about this topic, users that are part of this project, issues associated with this project, pending pull requests, goals associated with the project, etc. To this end, the end user may input a search query in a suitable query form or text input bar in the client application 112.

In another example, the end user need not enter a search query. Instead, the client application may automatically generate and forward the search query to the search engine 120. This may happen in cases where the client application 112 displays a dashboard or some other UI that shows different types of data related to a certain topic. For instance, the dashboard may display objects an end user is associated with, or the dashboard may display objects related to a given topic—such as a project the user is currently a part of. In such cases, when the end user opens the dashboard, the client application 112 automatically generate a search query associated with the topic for the dashboard and communicates this to the input/output module 202.

In either case—user generated or automatic—the search query is a string that defines two or more queryable entities and includes at least one search clause. For example, a search query may be "from (projects, users, documents) name LIKE legal AND label=red". In this case, the search query includes the queryable entities "projects," "users" and "documents" and the search clause "name LIKE legal AND Label=red".

A search clause further includes one or more search conditions. Each search condition includes a field (which maps to a search engine field), an operator (which maps to a search engine field operator that is valid for that field) and a field value (which is of a type that is valid for that search engine field). If the search clause includes two or more search conditions it also includes a joining (e.g., Boolean) operator. For example, the search clause "name LIKE legal AND label=red" includes two search conditions "name LIKE legal" and "label=red" that are joined by the Boolean operator AND. In these cases, "name" and "label" are fields, "LIKE" and "=" are field operators and "legal" and "red" are field values.

In addition to queryable entities and search clauses, the search query may include additional clauses. For example, the search query may include an ordering clause that indicates the order in which the returned search results should be ordered, the size of the subset of the results to be returned (or the page size), etc. An example of an ordering clause may be ORDER BY creation_date ASC, which indicates that the search results should be ordered based on the ascending creation dates of the records.

Figure 7:
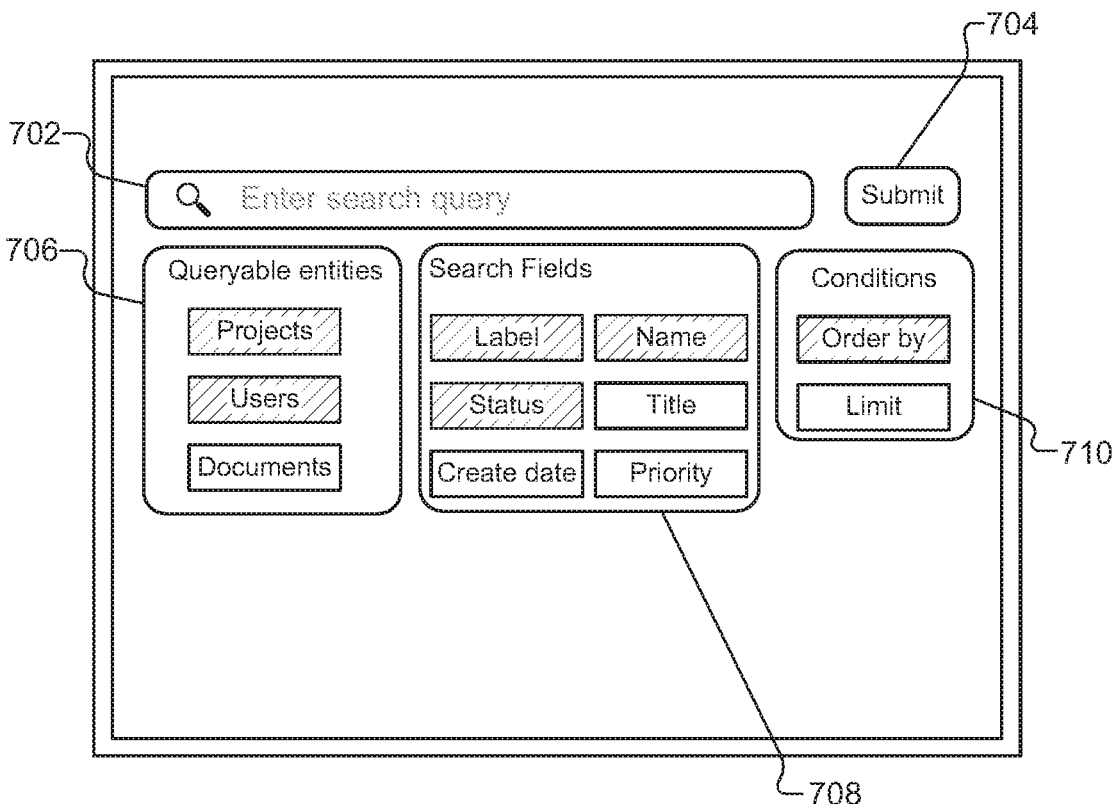
FIG. 7 is a screenshot illustrating an example user interface (UI) for providing an input search query.

FIG. 7 illustrates an example search interface 700 that may be provided by client application 112 to perform the search. The search interface 700 includes a search bar 702, and a selectable affordance 704 for submitting the search query. In addition, the search interface 700 may include means to help the user create the search query. For example, when the user selects the search bar 702, the search interface 700 may provide a list of queryable entities 706 the user can select. In the search interface 700, three queryable entities are provided—Projects, Users and Documents. Once the user has selected one or more queryable entity 706, the search interface 700 may provide a list of search fields 708 associated with those queryable entities that the user can select. In the example shown in FIG. 7, if the user selects the queryable entities 'projects' and 'users', the search interface 700 displays search fields 708 associated with those selected queryable entities. In some examples, once the user selects a field, the user interface may provide the user with a list of operators that may be allowed for that field, etc.

Further still, the search interface 700 may also display selectable conditions 710 such as 'order by' and 'limit' that can be selected to include conditional clauses in the input query. In this manner, the search interface 700 may aid the end user in creating a valid search query. It will be appreciated that search interface 700 is merely an example. In other embodiments, the means to create the input query may not be displayed outside the search bar. Instead, they may be displayed as drop-down menus while the user is inputting the search query. In still other examples, the search interface may simply include a search bar 702 and no other Once the end-user has created the search query, the user may submit the query using the selectable affordance 704. The client application 112 may then forward the search query to the search engine and in particular to the input/output module 202.

In some embodiments, the input search query may be associated with a combined custom cursor. This will be the case if the input search query has previously been run and the client system 110 has requested a further page of results. Where input search query is associated with a combined custom cursor, the combined custom cursor may be received from the client application 112 with the input search query. Alternatively, the combined custom cursor may be stored by the search server 122 in the storage 124 and identified/associated with the input search query—e.g., based on the query itself, the client application 112 from which the query is received, and/or other data. If it is the first time the input search query has been received, no custom cursor will be associated with the input search query.

In certain embodiments, the search query is associated with additional data. For example, the search query may be associated with an account identifier that identifies an account (e.g., an account that is responsible for the search query being made or that the search query is to be executed on behalf of) and/or that identifies the client application that generated the search query.

Returning to method 400, at step 404, the parsing module 204 is configured to parse the search query to determine a validity of the search query. This may include a number of different validity-checking processes. For example, it may include determining whether the input search query is syntactically valid—i.e., whether the input search query includes one or more queryable entities and search clauses. If the search query does not include queryable entities or a search clause, the parsing module 204 determines that the search query is invalid. Otherwise, if it identifies one or more queryable entities and one or more search clauses, it determines whether these are appropriate. To this end, the parsing module 204 may compare the identified queryable entities in the search string with queryable entities maintained by the databases (e.g., by querying table A). If the parsing module 204 identifies matches for the queryable entities in table A, it determines that the queryable entities are valid. Otherwise, it may determine that the queryable entities are invalid.

Similarly, the parsing module 204 may check the syntax of the search clause to determine whether the search clause includes a field, and operator, and a field value and whether the field matches a search engine field (e.g., by performing a lookup in the field table B), the operator matches a search engine operator allowable for that field, and the value of the field matches the value type allowed for that field.

In some examples, the parsing module 204 may also determine whether the fields in the search clause are available in the queryable entities in the search query. This may be done, for example, by checking whether the fields mentioned in the search clauses are associated with the queryable entities in table C. If one or more of the fields are not associated with the queryable entities in table C, the parsing module 204 may invalidate the search query. Otherwise, it may decide that the search query is valid.

If the parsing module 204 for some reason determines that the search query is invalid, the method proceeds to step 406, where the parsing module generates an error message. The error message may simply state that there is an error in the search query, or the error message may include specific error messages that indicate the precise error with the search query—e.g., queryable entity not present, search clause absent, field name invalid, operator invalid for field, field value invalid for field, etc.

The input/output module 202 may communicate the error message to the client application 112 and the client application 112 may display the error message on a display of the client system 110. In response to receiving the error message, the end user may correct the errors identified in the error message and submit a new search query, which the client application 112 forwards to the input/output module 202 at step 402.

Returning to step 404, if the parsing module 202 determines that the search query is valid, it passes the validated search query to the native query generator 206 and the method proceeds to step 408, where the native query generator 206 identifies the number of queryable entities in the search query and the corresponding databases associated with those queryable entities. For example, if the search query includes four queryable entities, the native query generator 206 performs a lookup with these queryable entities in table A to identify the databases that maintain these queryable entities. Based on the lookup, it may determine that two of the entities are maintained by database 130A and the other two entities are maintained by databases 130B and 130C, respectively.

In some embodiments, depending on the number of queryable entities identified at step 408, the search engine and in particular the native query generator 206 may execute processing threads or runners. Each runner may be configured to execute steps 410-420 for its associated queryable entity. For example, if four queryable entities are identified at step 408, the native query generator 206 may execute four runners—each configured to execute steps 410-420 for its corresponding queryable entity. The runners may execute the steps substantially simultaneously so as to reduce query processing time.

In other embodiments, instead of executing multiple processing threads or runners, the native query generator 206 may perform steps 410-420 serially for different queryable entities. In this case, in the example discussed above, the native query generator 206 may execute steps 410-420 four times (for different queryable entities) before the method proceeds to step 420.

In either event, this disclosure describes steps 410-420 just once. However, it will be appreciated that these steps may be performed multiple times or by multiple runners depending on the number of queryable entities that are identified from the search query.

At step 410, the native query generator 206 generates a native query for one of the queryable entities identified in the input search query. Consider the example of the search query "from (projects, goals, teams) name LIKE legal AND label=red". In this case, the query includes three queryable entities—projects, goals, and teams. Method steps 410-420 will be described with respect to one of these queryable entities—Projects. It will be appreciated that the same step will be performed for the other queryable entities (Goals and Teams).

To generate the native query, the native query generator 206 retrieves portions of the input search query for the selected queryable entity as follows—

From(projects)name LIKE legal AND label=red

It will be appreciated that when this step is performed for the other queryable entities, the native query generator 206 will retrieve portions of the input search query for those queryable entities as follows—

From(goals)name LIKE legal AND label=red

From(teams)name LIKE legal AND label=red

The native query generator 206 then translates the portion of the search query corresponding to the selected queryable entity into native query language understood by the underlying database. To this end, it determines the fields for that queryable entity maintained by the corresponding database and translates the search engine fields to the database fields. It may do so by querying table C. In one example, it may determine that the database fields for Projects corresponding to the search engine field "name" are "project title" or "project name." Similarly, it may determine that the database fields for Projects corresponding to the search engine field "label" is "label."

It may also determine the operators used by the corresponding database and translate the search engine operators in the query to the database operators. It may do so by querying table D. For example, it may determine that database 130C uses the operator IN instead of the operator FROM, uses the LIKE operator, and utilizes the "==" operator instead of the "=" operator.

Finally, the native query generator 206 also processes the "value" portion of the search query and transforms it into the data type accepted by the corresponding database. It may do so by querying table B. In particular, the native query generator 206 may compare the value type in the input search query with the value type allowed for the corresponding field and queryable entity in table B and either update the value if required or make no change to the values. In the example query above, it may determine that no changes are required to the values. At the end of this step, the translated native query for the Project queryable entity may be as follows—

IN(projects)name LIKE legal AND label==red

It will be appreciated that the native query generator 206 converts the other portions of the input search query in a similar manner for the other identified queryable entities. In one example, the native query generator 206 may determine that the database field for Goals corresponding to the search engine field "name" is "goal name" and the database field for Teams corresponding to the search engine field "name" is "team name." It may also determine that the database field for Goals corresponding to the search engine field "label" is "tag" and the database field for Teams corresponding to the search engine field "label" is "tag." Similarly, it may determine the operators and values for each of these queryable entities and generate translated native queries for those queryable entities as follows—

IN(goals)name LIKE legal AND label==red

IN(teams)name INCLUDES legal AND label=red

Returning to method 400, once the native query has been generated, the method proceeds to step 412, where the native query generator 206 determines whether the input search query has previously been run and the client system 110 has requested a further page of results or whether it is a new search query. This determination can be made in one of two ways.

In one case, where custom cursors are provided to client systems 110 with query results, the input search query will include a custom cursor if the query have been previously run and the client system 110 has requested a further page. If the input search query does not include a custom cursor, the native query generator 206 can determine that the search query has previously not be executed for that client system.

In another case, where the custom cursors are maintained by the search engine 120, the input search query may include uniquely identifiable information such as one or more of: a query identifier, a user identifier, and/or a client application identifier that may be stored against a custom cursor for the query in the storage 124. The native query generator 206 can perform a lookup with that uniquely identifiable information in the storage. If a match is found, it can determine that the input search query has previously been executed. If it does not find a match, the native query generator 206 can determine that the input search query was not previously executed.

Using any one of these methods, if the native query generator 206 determines that the input search query has previously been executed, the method proceeds to step 414, otherwise, it directly proceeds to step 418.

At step 414, the native query generator 206 determines the pagination information for that native query from the custom cursor.

As described previously, if a search query was executed on multiple queryable entities, the custom cursor may be a concatenation of custom cursors for each queryable entity. In the example search query above, the custom cursor received with the input search query or from the search engine's storage, may be as follows— base64(projects[after=3,first=5];goals[after=2,
first=5];teams[after=0paQu4,first=5,subitem=2])

The native query generator 206 may divide this custom concatenated cursor into individual custom cursors as follows— projects[after=3,first=5];

goals[after=2,first=5];

teams[after=0paQu4,first=5,subitem=2]

It may then translate the individual custom cursor corresponding to the currently processing native query (e.g., projects[after=3, first=5]) into pagination information for that native query. To do so, the native query generator 206 may query table E to determine the pagination technique used by the database associated with that queryable entity— i.e., database 130C, and to determine the format of the pagination information for this database. For instance, it determines that database 130C uses offset-limit based pagination. It then determines that the format for offset based pagination is offset=x, limit=y.

The native query generator 206 then translates the custom cursor for that native query using this translation information. The resulting pagination information may be as follows—

Projects[offset=3,limit=5]

It will be appreciated that the native query generator 206 converts the other custom cursors in a similar manner for the other identified queryable entities. In one example, the native query generator 206 may determine that the pagination technique used for Goals is an offset-limit and the technique used for Teams is cursor based. It may also determine that the format for cursor-based pagination is cursor {record id} and for offset based pagination is offset=x, limit=y. It then translates the custom cursors of those native queries as well using this translation information. The resulting pagination information for the other two queryable entities may be as follows—

Goals[offset=2,limit=5]

Teams[cursor{0paQu4}]

At step 416, the pagination information is added to the corresponding native query and the updated native query may be as follows—

IN(projects)name LIKE legal AND label==red,off-
set=3,limit=5

Once the native query is generated (with or without pagination information), the native query generator 206 performs a search at step 418. This step involves a number of sub-steps and is described in detail with reference to the flowchart depicted in FIG. 5.

In particular, the native query generator 206 communicates the native query to the input/output module 202 and instructs the input/output module 202 to interrogate the corresponding database using the native query.

The method 418 commences at step 502 where the native query is executed. That is the native query is used to interrogate the corresponding database and initial search records are received from the corresponding database. For example, database 130C may be interrogated using the Projects native query. This interrogation may include communicating the native query from the input/output module 202 to the DBMS 132 of the corresponding database. The DBMS then retrieves search records that match the corresponding native query and any other additional clauses or conditions associated with the query (such as offsets, limit/ maximum number of results, cursor information, sort instructions, etc.). If limit information that indicates the maximum number of results to provide to the search engine 120 is not provided, the DBMS may communicate a maximum default number of search results back to the search engine 120.

At step 504, search records are received from the database at the input/output module 202 and are communicated to the pagination module 210. The pagination module 210 then generates an interim custom cursor. If the database provides less than the maximum number of records requested, the pagination module 210 determines that the corresponding database does not have any further records matching that search query and creates a custom cursor with a NULL value.

Alternatively, if the search records are received from a database that uses offset-limit pagination, the database does not communicate any pagination information with the search results. In this case, if the maximum number of records are received, the pagination module 210 creates a custom cursor based on the number of records received from the database, a predetermined maximum number of records required from the database, and any previous custom cursor available for that native query. For example, if the present results correspond to page 2 of the search results and the predetermined maximum number of records required from the database is 10, the pagination module 210 may create a custom cursor as follows: [After=20, First=10].

In case the search records are received from a database that uses cursor-based pagination, the database communicates an opaque cursor with the search records. In this case, if the maximum number of records are received, the pagination module 210 creates a custom cursor based on the opaque cursor received from the database and the predetermined maximum number of records required from the database. For example, if the search engine receives the cursor 0paQu4 and the predetermined maximum number of records required from the database is 10, the pagination module 210 may create a custom cursor as follows [After=0paQu4, first=10].

As described previously, in some cases, the search results may be filtered to remove one or more ineligible search results. In one example, the search results may be filtered to discard any search results the user does not have permission to view. In such embodiments, the method 418 proceeds to step 506, where the search records received for each queryable entity are filtered. To this end, the search records received from the database (e.g., database 130C) are communicated to the authentication module 212 together with the user identifier received with the initial search query. The authentication module 212 communicates the search record identifiers and user identifier to the permission system 150, which returns a response that indicates the search records the user has access to. In one example, the permission system 150 may only return the identifiers of the search records the user has access to. In other examples, it may return all the search records along with flags indicating whether the user has permission to view the corresponding record or not.

Based on the results received from the permission system 150, the authentication module 212 discards search records from the interim search records the user does not have permission to access (i.e., ineligible search results) and returns a filtered list of search records (i.e., eligible search results) for the queryable entity to the native query generator 206.

As discussed above, in some cases, the native query generator 206 may be configured to communicate a predetermined number of maximum search records to the aggregator module 208 for each queryable entity. In some cases, the predetermined number of maximum search records per database (x) may be the same as the number of total records (n) to be communicated to the client system 110 in a first page. For example, if the client system 110 initially requests 10 records matching the search query, the predetermined maximum number of records per queryable entity may also be set to 10. This may be done such that the search engine does not need to request additional results from a search database in the event that all records from one entity are chosen in the final merge.

In other examples, the predetermined maximum number of records (x) may be different from the number of total records (n) to be communicated to the client system 110 in a first page. For example, if the client system 110 initially requests 10 records matching the input search query, the predetermined maximum number of records per queryable entity may be set using the formula—

$$\text{No. of total records to be communicated in a first page/No. of queryable entities}$$

In cases where a predetermined maximum number of results are required per queryable entity, if one or more of the interim search records are discarded during the filtering step, the native query generator 206 may attempt to backfill those search records such that it can communicate the predetermined maximum number of search records for each queryable entity to the aggregator 208.

The following method steps are performed in such embodiments.

At step 508, the native query generator 206 determines whether the number of filtered records for the native query is less than the predetermined maximum number of records. If the native query generator 206 determines this to be the case, the method proceeds to step 510 where it determines whether the custom cursor value for that native query is NULL. If the cursor value is NULL, it indicates that the corresponding database has no more records that match the native search query. Alternatively, if the custom cursor value is not NULL, it indicates that the corresponding database may have more records that match the native search query.

Accordingly, if at step 510, a determination is made that the cursor value is not NULL, the method proceeds to step 512, where the native query generator 206 checks whether a re-execution limit has exceeded. This check may be performed to limit the number of times the native query generator will try to re-fetch new search records so that the native query generator is not inadvertently stuck in a loop consuming too much time or too many resources. To perform this check, in one example, the native query generator may initialize a counter the first time it determines at the end of step 510 that the cursor value is not NULL. Each time the native query generator then performs method step 514 that counter is incremented. At step 512, the native query generator compares the counter value to a predetermined threshold value (e.g., 3). If the counter value exceeds the threshold value a determination is made that the re-execution limit has exceeded. Otherwise, a determination is made that the re-execution limit has not been exceeded.

If at step 512, the native query generator 206 determines that the re-execution limit has not been exceeded, the method proceeds to step 514, where the native query is re-executed with the custom cursor for the next page. In particular, the custom cursor generated at step 504 may first be translated back into the pagination information for the corresponding database (in a manner similar to that described with respect to method step 414) and added to the native query (in a similar fashion to that described with respect to method step 416). Then, the native query may be communicated to the input/output module 202 to perform the search for the next set of search records.

Thereafter method steps 502-514 are repeated until the number of filtered search records is not lesser than the predetermined maximum number of search records required, a determination is made that the database has no further search records that match the query, or a determination is made that re-execution limit has been reached. If a determination is made that the database has no further search records that match the query (yes path from method step 510), or a determination is made that re-execution limit has been reached (yes path from method step 514), the method proceeds to step 420, where the native query generator 206 returns the filtered search records as final search records to the aggregator module 208 along with a next page cursor (as computed at step 504).

Alternatively, if a determination is made that the number of filtered search records is not lesser than the predetermined maximum number of search records required (no path from method step 508), the method proceeds to step 516, where the native query generator determines whether the number of filtered search records exceeds the limit. This may be the case, for example, if the execution of the native query results in 10 records initially, out of which 5 records are filtered out. The native query generator may then rerun the query for the next set of 10 results and the user may have permission to view all 10 of these records. In this case, at the end of the second time method step 506 is executed, the native query generator 206 may have 15 filtered search record. In such cases, if a determination is made that the number of filtered search records exceeds the limit, the method proceeds to step 518 where the native query generator 206 selects the first x records and discards the rest. It also requests the pagination module 210 to recalculate the custom cursor for the next page.

The pagination module 210 recalculates the next page custom cursors for the native query based on the underlying database's pagination technique, the number of search records corresponding to that native query that have been discarded and the custom cursor generated at step 504.

In case the search records are received from a database that uses offset-limit pagination, the custom cursor is updated by changing the "After" field value based on the number of records that were discarded at step 518. For example, if 5 records were discarded after two pages of search records were retrieved from the database, the custom cursor can be recalculated from [After=20, First=10] to [After=15, First=10].

In case the search results are received from a database that uses cursor-based pagination, the pagination module 210 records pagination information (e.g., page cursor and item number) of each of the search records received from the database. It may do so at step 504. For example, consider the case where the native query generator 206 receives a first set of 10 search records from the cursor-limit pagination-based database 130B. It may create a table including the search records and their corresponding pagination information such as corresponding page cursor and SubItem number. The pagination data indicates the custom cursor that should be used to receive the next search record for each of the search records. In one example, the table may be as follows when step 504 is initially performed—

TABLE F

| No. | Record ID | Pagination data |
|---|---|---|
| | Example pagination data for search results received from a database that supports cursor-based pagination | |
| 1 | 347298 | After=Null, Subitem=1 |
| 2 | 843728 | After=Null, Subitem=2 |
| 3 | 234001 | After=Null, Subitem=3 |
| 4 | 094230 | After=Null, Subitem=4 |
| 5 | 248397 | After=Null, Subitem=5 |
| 6 | 278136 | After=Null, Subitem=6 |
| 7 | 237881 | After=Null, Subitem=7 |
| 8 | 237823 | After=Null, Subitem=8 |
| 9 | 238186 | After=Null, Subitem=9 |
| 10 | 238240 | After= OpaQu4, Subitem=0 |

As seen in this table, for each search record, the cursor and subitem information required to obtain the next record is provided. As the $10^{th}$ record is the last record associated with the NULL cursor and the next record will be provided on the next page, the cursor value for that record includes the cursor value provided by the database at the end of step 502.

Then, after step 506, if five of the records (e.g., records 2, 3, 6, 8, and 10) are filtered (because the user does not have permission to view them), the table may be updated as follows—

TABLE G

| No. | Record ID | Pagination data |
|---|---|---|
| | Example pagination data after step 506 | |
| 1 | 347298 | After=Null, Subitem=1 |
| 2 | 094230 | After=Null, Subitem=4 |
| 3 | 248397 | After=Null, Subitem=5 |
| 4 | 237881 | After=Null, Subitem=7 |
| 5 | 238186 | After=Null, Subitem=9 |

Then, if the native query is rerun and the results are filtered again, the pagination module 210 may update the table to include the new set of filtered search records and their corresponding page and item numbers as follows—

TABLE H

| No. | Record ID | Pagination data |
|---|---|---|
| | Example pagination data after subsequent execution of step 502 | |
| 1 | 347298 | After=Null, Subitem=1 |
| 2 | 094230 | After=Null, Subitem=4 |
| 3 | 248397 | After=Null, Subitem=5 |
| 4 | 237881 | After=Null, Subitem=7 |
| 5 | 238186 | After=Null, Subitem=9 |
| 6 | 347263 | After= OpaQu4, Subitem=1 |
| 7 | 278316 | After= OpaQu4, Subitem=2 |
| 8 | 893472 | After= OpaQu4, Subitem=3 |
| 9 | 347482 | After= OpaQu4, Subitem=4 |
| 10 | 198237 | After= OpaQu4, Subitem=5 |
| 11 | 120897 | After= OpaQu4, Subitem=6 |
| 12 | 348972 | After= OpaQu4, Subitem=7 |
| 13 | 234789 | After= OpaQu4, Subitem=8 |
| 14 | 239474 | After= OpaQu4, Subitem=9 |
| 15 | 324971 | After= Cr6tCa, Subitem=0 |

Finally, at step 518, the extra search records are discarded. After that, the table may be updated as follows—

TABLE I

| No. | Record ID | Pagination data |
|---|---|---|
| | Example pagination data after step 510 | |
| 1 | 347298 | After=Null, Subitem=1 |
| 2 | 094230 | After=Null, Subitem=4 |
| 3 | 248397 | After=Null, Subitem=5 |
| 4 | 237881 | After=Null, Subitem=7 |
| 5 | 238186 | After=Null, Subitem=9 |
| 6 | 347263 | After= OpaQu4, Subitem=1 |
| 7 | 278316 | After= OpaQu4, Subitem=2 |
| 8 | 893472 | After= OpaQu4, Subitem=3 |
| 9 | 347482 | After= OpaQu4, Subitem=4 |
| 10 | 198237 | After= OpaQu4, Subitem=5 |

By maintaining the pagination data per search record in this manner for search records received from databases that use cursor-limit pagination techniques, the pagination module 210 can easily calculate the custom cursor for the corresponding native query at any point by simply using the pagination data associated with the last record maintained in the table.

Accordingly, in this example, the "After" field of the custom cursor can be updated based on the "After" field of the last record in the search records table and the "SubItem" field can be updated based on the "SubItem" field of the last record in the maintained search records table. Considering the example search records table shown above, the pagination module may update the custom cursor at step 518 as follows: [After=0paQu4, First=10, SubItem=5].

It will be appreciated that once the aggregator module 208 receives the search records for each of the identified queryable entities, the method proceeds to step 422 where the aggregator module generates a set of combined search results. This method step is described in detail with respect to the sub-process 422 illustrated FIG. 6, which commences at sub-step 602 where the search records received for the individual queryable entities are merged into one return set including all the filtered search records for the individual queryable entities.

Next, at sub-step 604, the aggregator module 208 sorts the result set based on one or more criteria. In some cases, the input search query may include an ordering clause that indicates a sort order. For example, the input search query may include an ordering clause that indicates that the search results should be sorted in ascending or descending date order, or they should be sorted based on ascending or descending relevance order, etc. In other cases, the input search query may not specify any sort order. In case a sort order is provided as part of the search query, the aggregator module 208 uses this sort order to sort the result set. Otherwise, if a sort order is not provided, the aggregator module 208 utilizes a default sort order, such as alphabetically, most recently created records, most viewed records, most relevant to the input search query, etc.

Once the return set is sorted, the aggregator module 208 creates a set of combined records based on the limit of the number of records requested by the client system 110. As described previously, an end user may provide this limit as part of the input search query, or the client application may apply a default limit (based on the settings of the client application) if the end user does not provide a limit.

At step 606, the aggregator module determines whether the total number of search records in the return set exceeds the limit (n) of the number of records requested by the client system. If it determines this to be the case, the method proceeds to step 608 where the aggregator module 208 creates the combined set of results by selecting the top n sorted search records and discarding the rest. Alternatively, if the aggregator module 208 determines that the total number of search records in the return set is equal to or lower than the limit (n), the method proceeds to step 610 where the aggregator module 208 creates the combined set of results by selecting all the sorted search results from the return set.

Next, if the total number of search records in the return set had exceeded the limit n, the method proceeds to step 612 where the aggregator module 208 requests the pagination module 210 to recalculate the next page cursors for each of the native queries.

The pagination module 210 recalculates the next page custom cursors for the native query based on the underlying database's pagination technique, the number of search records corresponding to that native query that have been discarded by the aggregator module at step 608 and the existing custom cursor for that native query.

This step is similar to step 518 of method 418. In particular, in case the search records are received from a database that uses offset-limit pagination, the existing custom cursor is updated by changing the "After" field value based on the number of records that were discarded at step 608. For example, if 7 of the search records corresponding to that native query were discarded at step 608, the custom cursor can be recalculated from [After =15, First=10] to [After=8, First 10].

In case the search results are received from a database that uses cursor-based pagination, the pagination module 210 generates the cursor for the next page based on the pagination information associated with the last search record associated with that native query that is included in the combined search results. For example, the "After" and "SubItem" fields of the custom cursor can be updated based on the "After" and "Subitem" information associated with the last selected record in the search records table maintained by the pagination module 210. For example, consider the table I, if the aggregator module 208 utilizes the first four results from this table, the updated custom cursor may be as follows: [After=Null, Limit=10, Subitem=7]. Alternatively, if it utilizes the first six results from this table, the updated custom cursor may be as follows: [After=0paQu4, Limit=10, Subitem=1].

It will be appreciated that the pagination module recalculates the custom cursors for each of the native queries in a similar fashion. Further, in some embodiments, the pagination data (e.g., table I) may be deleted after step 612.

Returning to method 422, once the custom cursors are recalculated for the native queries, the custom cursors can be combined into a signal concatenated cursor object at step 614 and sub-process 422 ends.

Thereafter, the method proceeds to step 424, where the set of combined search results and concatenated cursors are communicated to the client system 110. The client application 112 running on the client system 110 may update the input search query based on the concatenated custom cursor and may render and display the received search records in a UI. If the search results are a first subset or first page of results, the concatenated custom cursor may be appended to the end of the input search query. Otherwise, if the search results are a subsequent subset or a subsequent page of results, the client application 112 may discard any previously present concatenated custom cursor and replace it with the custom cursor received at step 424.

Figure 8:
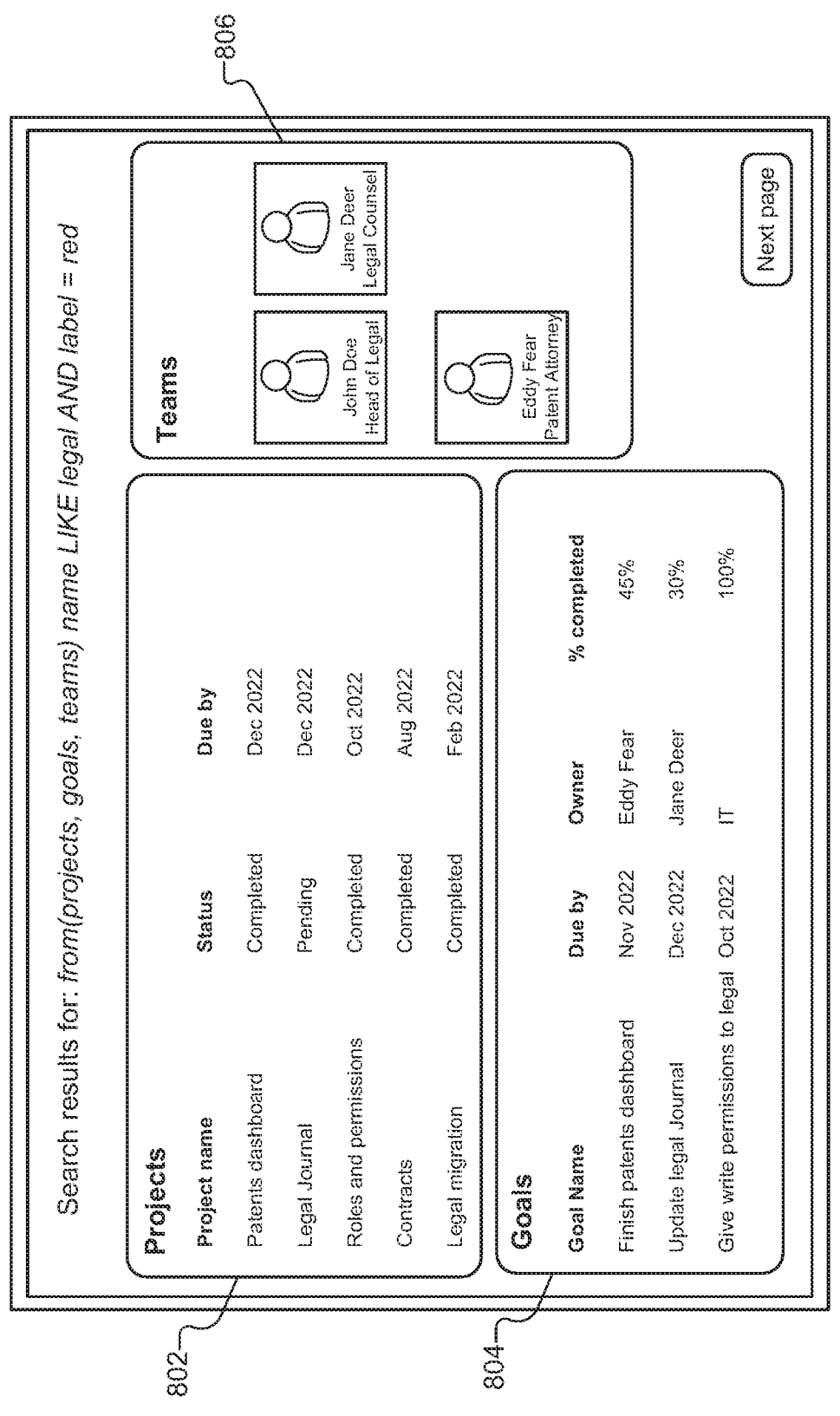
FIG. 8 is a screenshot illustrating an example UI for displaying a combined set of search results according to some aspects of the present disclosure.

FIG. 8 illustrates an example UI 800 depicted by the client application 112 in response to receiving the search results. In one example, the UI 800 is divided into subsections or portions for each queryable entity, and each portion provides search results corresponding to that queryable entity. In the example depicted in UI 800, a search was performed in three queryable entities—Projects, Goals and Teams, and the UI depicts three sections 802, 804, and 806 for displaying search results corresponding to each of these three queryable entities.

It will be appreciated that where the UI 800 is sectioned in this manner, each section may display different types of information for the search results it is displaying and may visually display the search results differently. For example, as shown in FIG. 8, the projects subsection 802 displays the search results as a table and includes some information about each search result. In this example, the information includes project names, project status and due by dates. In other examples, the projects subsection 802 may show fewer or more types of information for each search result including, e.g., the user responsible for each project, the last date/time the project was updated, etc. Similarly, the goals subsection 804 displays the search results as a table and includes some information about each displayed goal. In this example, the information includes goal name, responsible person, when the goal is supposed to be finished by and the percentage of the goal completed. The teams subsection 806 on the other hand displays the search results as tiles. Each tile may represent a search result and may include information such as user picture, user name and title.

It will be appreciated that the position, sizes, and types of information displayed in each section in UI 800 is merely exemplary. The UI can be organized in any other suitable way to show the search results for the different queryable entities. The search records in each section may be selectable—where selecting the search record displays further information about the record, navigates the user to a different webpage or UI that shows the underlying result in a different application, etc. For example, selection of a user tile in section 806 may navigate the user to a team directory page for that user that shows more information about the user. Similarly, selection of a project from the projects section may navigate the user to a wiki page about the project that includes further details and documentation about the project.

In other examples, additional information about the search results may be depicted in the same application, e.g., in a pop-up window or such.

Although UI 800 depicts the search results for different queryable entities being displayed in different sections, this need not be the case in all examples. In some cases, the search results may be combined and displayed in a single list or table.

In addition to the search results, the UI 800 includes a mechanism to request a next page of results. In one example this may be a selectable affordance such as a button, an arrow symbol, a selectable page number, etc.

The end user may interact with the UI and view the search records. If the user wishes to see more search records matching the input search query, the user may make a selection on the UI for receiving the next page of search results. When the client application 112 detects this input, the client application 112 may create a new search request that includes the original input search query and custom cursor and any other additional information about the end user or client application and forward this to the search engine 120.

The search engine 120 receives this search request for the next page of search results at step 426 and the method then proceeds to step 404.

Alternatively, if the end user does not wish to view more results or decides to update the input search query, method 400 ends at step 424.

It will be appreciated that although method 400 is described such that query validation is performed by the search engine 120, this need not be the case in all implementations. In some cases, query validation may be performed by the client application 112. In such cases, the parsing module 202 may be present in the client application 112 instead of the search engine 129 and the parsing module may communicate with the storage 124 to determine whether the search query is valid. Otherwise, tables A-D may also be stored in the client system 110 and in such cases the client application 112 may perform the validation without any communication with the search engine 120.

It will also be appreciated that method 400 and sub-processes 418 and 422 are described for an embodiment where an input search query includes multiple queryable entities. In other embodiments, the input search query may include a single queryable entity. For example, the user may simply wish to view search results for a single queryable entity and/or from a single underlying database. FIG. 9 is a flowchart illustrating an example method for performing a search in such cases.

The method commences at step 902, where the input/output module 202 of the search engine 120 receives an input search query from the client system 110. In one example, an end user may use client application 112 to perform a search—for example, an end user may wish to find projects an end user is associated with. Similarly, the end user may wish to find teams the user is a part of. To this end, the end user may input a search query in a suitable query form or text input bar in the client application 112.

In another example, the end user need not enter a search query. Instead, the client application may automatically generate and forward the search query to the search engine 120. This may happen in cases where the client application 112 displays a dashboard or some other UI that shows different the output of the search—e.g., a projects UI that shows currently active projects the user is a part of, or a teams UI that shows current teach structures for different teams. In such cases, when the end user opens the dashboard, the client application 112 automatically generates a search query associated with the dashboard and communicates this to the input/output module 202.

In either case—user generated or automatic—the search query includes at least one search clause. For example, a search query may be "name LIKE legal AND label=red". As described previously, each search condition includes a field, an operator and a field value that may match the field, operator and field value type accepted by the underlying database. If the search clause includes two or more search conditions it also includes a joining (e.g., Boolean) operator.

In addition to search clauses, the search query may include additional clauses. For example, the search query may include an ordering clause that indicates the order in which the returned search results should be ordered, the size of the subset of the results to be returned (or the page size), etc. In some examples, where the underlying database maintains more than one queryable entity, the search query may also specify the queryable entities that should be searched.

In one example, a search interface such as that shown in FIG. 7 may be provided by the client application 112 to perform the search. However, in the present embodiment, the user interface may not include the queryable entities section 706 or it may include the queryable entities section

706, which only shows the queryable entities associated with the one underlying database associated with the search engine 120.

Once the end-user has created the search query, the user may submit the query using the selectable affordance 704. The client application 112 may then forward the search query to the search engine and in particular to the input/output module 202.

In some embodiments, the input search query may be associated with a custom cursor. This will be the case if the input search query has previously been run and the client system 110 has requested a further page of results. Where input search query is associated with a custom cursor, the custom cursor may be received from the client application 112 with the input search query. Alternatively, the custom cursor may be stored by the search server 122 in the storage 124 and identified/associated with the input search query—e.g., based on the query itself, the client application 112 from which the query is received, and/or other data. If it is the first time the input search query has been received, no custom cursor will be associated with the input search query.

In certain embodiments, the search query is associated with additional data. For example, the search query may be associated with an account identifier that identifies an account (e.g., an account that is responsible for the search query being made or that the search query is to be executed on behalf of) and/or that identifies the client application that generated the search query.

Returning to method 900, at step 904, the parsing module 204 is configured to parse the search query to determine a validity of the search query. This step is similar to step 404 of method 400 and therefore will not be described in detail again. It is to be understood that at this step the parsing module 204 determines whether the input search query is syntactically valid.

In some embodiments this step may be omitted. For example, in some cases the search engine 120 may only manage the custom cursors for the underlying database. In such cases, the search engine 120 may not provide any query validation services. Instead, the search engine may simply forward the search query from the client device to the underlying database. The underlying database may determine whether the query is valid—e.g., based on its own query validation rules.

If the search query is not invalid, the method proceeds to step 406, where the parsing module generates an error message. The error message may simply state that there is an error in the search query, or the error message may include specific error messages that indicate the precise error with the search query—e.g., queryable entity not present, search clause absent, field name invalid, operator invalid for field, field value invalid for field, etc.

The input/output module 202 may communicate the error message to the client application 112 and the client application 112 may display the error message on a display of the client system 110. In response to receiving the error message, the end user may correct the errors identified in the error message and submit a new search query, which the client application 112 forwards to the input/output module 202 at step 402.

Returning to step 904, if the parsing module 202 determines that the search query is valid, the method proceeds to step 908, where the search engine 120 determines whether the input search query has previously been run and the client system 110 has requested a further page of results or whether it is a new search query. This step is similar to step 412 of method 400 and therefore is not described here again.

If the search engine 120 determines that the input search query has previously been executed, the method proceeds to step 910, otherwise, it directly proceeds to step 912.

At step 910, the search engine 120 determines the pagination information for the underlying database from the custom cursor.

As described previously, the custom cursor may include an after field that includes the opaque cursor for next set of results from the underlying database, a first field that indicates the number of search results to be requested from the underlying database, and a subitem field that indicates the number of search results from that subset or page of results that have already been processed by the search engine 120.

As step 910, the search engine retrieves this custom cursor, e.g., [after=0paQu4, first=5, subitem=2], and then translates the custom cursor into pagination information for the underlying database. For instance, it may convert the custom cursor into pagination information for the underlying database as follows—[cursor {0paQu4}]

The converted pagination information is then added to the input search query and the updated native query may be as follows— name LIKE legal AND label=red,cursor{$0paQu4$}

Next, the search engine 120 executes the search query on the underlying database at step 912. This step is similar to step 418 of method 400 (but for a single database that supports cursor-based pagination). The sub-steps of this method step are described with reference to FIG. 5 and will not be described in detail again.

In particular, the search engine 120 uses the input search query to interrogate the underlying database and initial search records are received from the database. An interim custom cursor is generated based on the received results. If the database provides less than the maximum number of records requested, the search engine 120 determines that the corresponding database does not have any further records matching that search query and creates a custom cursor with a NULL value.

Alternatively, if the maximum number of records are received, the pagination module 210 creates a custom cursor based on the opaque cursor received from the database and the predetermined maximum number of records required from the database. For example, if the search engine receives the cursor ie34ce and the predetermined maximum number of records required from the database is 10, the pagination module 210 may create a custom cursor as follows [After=ie34ce, first=10].

As described previously, in some cases, the search results may be processed, e.g., filtered. In one example, the search results may be filtered to discard any search results the user does not have permission to view.

If one or more of the initial search records are discarded during the processing/filtering step, the search engine 120 may attempt to backfill those search records such that it can communicate the predetermined maximum number of search records to the client application 112.

To this end, search engine 120 determines whether the number of filtered records is less than the predetermined maximum number of records. If this is the case, the search engine 120 determines whether the custom cursor value is NULL. If the cursor value is NULL, it indicates that the database has no more records that match the input search query. Alternatively, if the custom cursor value is not NULL, it indicates that the corresponding database may have more records that match the input search query.

Accordingly, if a determination is made that the cursor value is not NULL, search engine 120 determines whether a re-execution limit has exceeded. This check may be performed to limit the number of times the search engine 120 tries to re-fetch new search records. If the search engine 120 determines that the re-execution limit has not been reached, the input query is re-executed with the interim custom cursor for the next page (which is first translated back into the pagination information for the database (in a manner similar to that described with respect to method step 910) and added to the input search query. Then, the input search query is executed on the database to retrieve the next set of search records.

Thereafter the method is repeated until the number of filtered search records is not lesser than the predetermined maximum number of search records required, a determination is made that the database has no further search records that match the query, or a determination is made that re-execution limit has been reached. If a determination is made that the database has no further search records that match the query, or a determination is made that re-execution limit has been reached, the method proceeds to step 914.

Alternatively, if a determination is made that the number of filtered search records is not lesser than the predetermined maximum number of search records required, the search engine 120 determines whether the number of filtered search records exceeds the limit. This may be the case, for example, if the execution of the native query results in 10 records initially, out of which 5 records are filtered out. The search engine 120 may then rerun the query for the next set of 10 results and the user may have permission to view all 10 of these records. In this case, at the end of the second time the search is executed, the search engine 120 may have 15 filtered search record. In such cases, if a determination is made that the number of filtered search records exceeds the limit, the search engine selects the first x records and discards the rest. It also recalculates the custom cursor for the next page based on the number of search records that have been discarded.

As described previously with respect to FIG. 5, for databases that support cursor-based pagination, the search engine records pagination data (e.g., page cursor and item number) of each of the search records received from the database, e.g., as depicted in tables XX-XX. Accordingly, the "After" field of the custom cursor can be updated based on the "After" field of the last record in the search records table after step 506 and the "SubItem" field can be updated based on the "SubItem" field of the last record in the maintained search records table.

The method 900 then proceeds to step 914 where the search engine 120 returns the search results obtained at the end of method 912 to the client application 112. In addition to the search results, the search engine 120 may also communicate the custom cursor to the client application 112 (in case the custom cursors are not stored or maintained by the search engine 120).

The client application 112 running on the client system 110 may update the input search query based on the custom cursor and may render and display the received search records in a UI. If the search results are a first subset or first page of results, the received custom cursor may be appended to the end of the input search query. Otherwise, if the search results are a subsequent subset or a subsequent page of results, the client application 112 may discard any previously present custom cursor and replace it with the custom cursor received at step 914.

The end user may interact with the UI and view the search records. If the user wishes to see more search records matching the input search query, the user may make a selection on the UI for receiving the next page of search results. When the client application 112 detects this input, the client application 112 may create a new search request that includes the original input search query and custom cursor and any other additional information about the end user or client application and forward this to the search engine 120.

The search engine 120 receives this search request for the next page of search results at step 916 and the method then proceeds to step 904.

Alternatively, if the end user does not wish to view more results or decides to update the input search query, method 900 ends at step 916.

It will be appreciated that method 900 depicted in FIG. 9 includes a query parsing step 904. This step may be omitted in some embodiments, where the search engine merely manages the custom cursors for a given input search query. In such cases, the query parsing step may be performed by the underlying database when it executes the query. For example, before providing search results corresponding to the query, the underlying database may determine whether the query is syntactically correct. If the database determines that the query is incorrect or invalid, it may generate an error message and communicate this to the search engine 120, which communicates it back to the client application 112 for display on the UI. In other examples, the parsing may be performed by the client application 112 before the input search query is even communicated to the search engine 120 at step 902 or step 916.

Further, in methods 400 and 900, it is presumed that results are filtered based on user permissions. This is merely an example, and the search results may be filtered based on any other conditions, such as visibility rules associated with the search results, without departing from the scope of the present disclosure. For instance, some search results may have timed visibility (e.g., search results that are supposed to expire after a given date) or may have been soft-deleted (i.e., the search result is marked as deleted in its data, but is not physically deleted from the data store and so is returned from the database), these search results may be filtered out before the search results are communicated to the client application 112.

Further still, in some embodiments, the search results received from the databases may not be filtered. In such cases, method steps 506-518 may be omitted from methods 400 and 900.

Methods 400 and 900 are described with limits—a limit n provided by the client application to indicate the number of results to be provided to the client application 112, and a limit x provided by the search engine 120 to the underlying databases indicating the maximum number of search results to be provided to the search engine. In some embodiments one or more of these limits may not be provided. For example, the client application 112 may not provide limit n and/or the search engine 120 may not provide limit x. In such cases, the search engine 120 and the underlying databases 130 may apply default n and x limits, respectively. Further, limits n and x may be the same or may be different, depending on the implementation.

Finally, it will be appreciated that the custom cursor objects of the present disclosure may be applied to any cursor-based pagination database to be able to consume any arbitrary records from a cursor-based pagination database without missing any records or duplicating any already consumed records.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Further, the terms "search results," "search records," and "records" are interchangeably used in this disclosure.

Unless otherwise stated, the terms "include" and "comprise" (and variations thereof such as "including," "includes," "comprising," "comprises," "comprised," and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer implemented method comprising:
executing a search on a database in response to a user search request received via a client application operated by a user, the search executed using a native search query generated based on the user search request, execution of the search returning a set of search results from the database and an opaque cursor for the native search query;
processing an initial subset of the set of search results;
evaluating the initial subset of the set of search results based a permissions criteria associated with the user to obtain a first filtered subset of search results;
generating a custom cursor object including:
a number of search results in the initial subset of search results;
a number of search results that were evaluated to obtain the first filtered subset; and
the opaque cursor associated with the native search query;
causing display of the first filtered subset of search results on the client application;
in response to receiving a user request for additional search results associated with the search:
evaluating, using the custom cursor object, an additional subset of the set of search results based on the permissions criteria associated with the user to obtain a second filtered subset of search results, wherein:
the second filtered subset of search results does not include any search result included in the first filtered subset of search results; and
at least one search result of the second filtered subset of search results is not included in the initial subset of search results;
updating the custom cursor object based on a number of search results of the additional subset of search results that were evaluated to obtain the second filtered subset of search results; and
causing display, on the client application, of the second filtered subset of search results.

2. The computer implemented method of claim 1, wherein:
the custom cursor object further comprising an after-value in accordance with all search results from the set of search results being unprocessed, and the after-value that is based on a previous opaque cursor returned by the database in response to a previous search in accordance with a previous search using the search query is executed, or the after-value having a null value in accordance with a previous search using the search query is not executed.

3. The computer implemented method of claim 1, wherein the custom cursor object including an after-value based on the opaque cursor in accordance with all of the set of search results are processed.

4. The computer implemented method of claim 1, wherein selecting the second subset of the first subset of the set of search results comprises:
filtering the first subset of search results based on a predefined criterion; and
selecting the second subset of search results from the first subset of the set of search results that match the predefined criterion.

5. The computer implemented method of claim 4, wherein the predefined criterion is whether a user that requested the search has permission to view search results from the set of search results.

6. The computer implemented method of claim 1, wherein processing the first subset of the set of search results is based on a maximum number of search results to be returned to a client system of a user that requested the search.

7. The computer implemented method of claim 1, further comprising returning the second subset of the first subset of search results and the custom cursor object to a client system of a user that requested the search.

8. The computer implemented method of claim 1, comprising:
prior to executing the search on the database, identifying the database from a set of databases based on a keyword extracted from the user search request.

9. The computer implemented method of claim 8, wherein the native search query is generated using field translation data indicating the keyword extracted from the user search request and a field value provided by the database.

10. The computer implemented method of claim 9, wherein:
the field translation data further includes native syntax data; and
generating the native search query further includes converting, using the native syntax data, an operator of the user search request into a native operator provided by the database.

11. The computer implemented method of claim 9, wherein the field translation data is configured to update in response to a creation or deletion of a data field provided by the database.

12. The computer implemented method of claim 1, wherein the permissions criteria are provided by a permissions system associated with the client application.

13. A computer implemented method comprising:

receiving a search request from a client application for a page of search results;

executing, based on the search request, a native search on a database, execution of the native search returning an initial set of search results from the database and a first opaque cursor;

filtering the initial set of search results to remove a subset of ineligible search results, thereby obtaining a filtered set of search results;

executing, based on the search request, a second search on the database, execution of the second search returning an additional set of search results and a second opaque cursor;

selecting at least an additional subset of the additional set of search results and adding the additional subset of search results to the filtered set of search results to generate the page of search results;

generating a custom cursor object, the cursor object including:

a first after-value based on the first opaque cursor if all of the search results in the additional set of search results are not included in the at least additional subset of search results; or a second after-value based on the second opaque cursor if all of the search results in the additional set of search results are included in the at least additional subset of search results; and returning the page of search results and the custom cursor object to the client application.

14. The computer implemented method of claim 13, wherein the custom cursor object further including a subitem value in accordance with all of the search results in the additional set of search results being unselected, the subitem value based on a number of results from the additional set of search results that are added to the page of search results.

15. The computer implemented method of claim 13, wherein the custom cursor object is generated to further include a maximum records value indicating a maximum number of records that are to be returned by the database.

16. The computer implemented method of claim 13, wherein filtering the initial set of search results includes:

determining whether a user that requested the native search has permission to view search results from the initial set of search results; and removing the search results from the initial set of search results that the user does not have permission to view.

17. The computer implemented method of claim 13, further comprising:

filtering the additional set of search results to remove at least an ineligible subset of ineligible search results before selecting the at least the additional subset of the additional set of search results to generate the page of search results.

18. The computer implemented method of claim 13, wherein:

the search request for a page of search results is a first search request for a first page of search results;

the custom cursor object is a first custom cursor object; and the method further comprising:

receiving a second search request for a second page of search results, the second search request comprising the first custom cursor object and the first search request;

executing, based on the second search request and the first custom cursor object, a third search on the database, execution of the third search returning the additional set of search results from the database and the second opaque cursor;

selecting a third subset of the additional set of search results, the third subset comprising search results that were not present in the additional subset of the additional set of search results;

executing, based on the second search request, a fourth search on the database, execution of the fourth search returning a third set of search results and a third opaque cursor;

selecting at least a fourth subset of the third set of search results and adding to the selected third subset of search results to generate the second page of search results;

generating a second custom cursor object, the second cursor object including:

a third after-value based on the second opaque cursor in accordance with all of the search results in the third set of search results being unselected; or a fourth after-value based on the third opaque cursor if all of the search results in the third set of search results are selected; and returning the second page of search results and the second custom cursor object to the client application.

19. The computer implemented method of claim 18, further comprising:

retrieving either the first opaque cursor from the first after-value of the first custom cursor object or the second opaque cursor from the second after-value of the first custom cursor object; and communicating the retrieved first or second opaque cursor to the database when executing the third search.

20. The computer implemented method of claim 18, further comprising:

determining whether the first opaque cursor includes a subitem value;

upon determining that the first cursor object includes the subitem value, retrieving the subitem value; and discarding a number of search results from the additional set of search results that match the subitem value before selecting the additional subset of the additional set of search results.

* * * * *